(12) United States Patent
Ohgi

(10) Patent No.: US 7,383,559 B2
(45) Date of Patent: Jun. 3, 2008

(54) DISC CARTRIDGE OF REDUCED SIZE

(75) Inventor: Takashi Ohgi, Miyagi (JP)

(73) Assignee: Sony Corporation, Tokyo (JP)

( * ) Notice: Subject to any disclaimer, the term of this patent is extended or adjusted under 35 U.S.C. 154(b) by 446 days.

(21) Appl. No.: 11/034,847

(22) Filed: Jan. 14, 2005

(65) Prior Publication Data

US 2005/0210491 A1    Sep. 22, 2005

(30) Foreign Application Priority Data

Jan. 21, 2004   (JP) .............................. 2004-013603

(51) Int. Cl.
    *G11B 23/03* (2006.01)
(52) U.S. Cl. ..................................... 720/725
(58) Field of Classification Search ................. 720/725
    See application file for complete search history.

(56) References Cited

U.S. PATENT DOCUMENTS 6,779,194 B2 * 8/2004 Okamoto et al. ........... 720/725
2003/0058783 A1 * 3/2003 Okamoto et al. ........... 369/291

FOREIGN PATENT DOCUMENTS

| JP | 61-174080 | 10/1986 |
|---|---|---|
| JP | 11-339437 | 12/1999 |
| JP | 2000-11580 | 1/2000 |
| JP | 2000-182308 | 6/2000 |
| JP | 2000-260151 | 9/2000 |
| JP | 2000-260154 | 9/2000 |
| JP | 2002-222574 | 8/2002 |
| JP | 2004-5770 | 1/2004 |

* cited by examiner

*Primary Examiner*—David Davis
(74) *Attorney, Agent, or Firm*—Oblon, Spivak, McClelland, Maier & Neustadt, P.C.

(57) ABSTRACT

A disc cartridge reduced in size and thickness and yet exhibiting sufficient strength. The disc cartridge includes a main body unit of the cartridge including upper and lower halves in which is housed an optical disc. A tubular section is formed in one of two areas delimited by an upstanding peripheral wall section and a housing forming wall section formed on a lateral side of the lower half with the tubular section being in continuation to the upstanding peripheral wall section and the housing forming wall section. The upper half includes a tubular abutment support abutted against the tubular section with the tubular abutment support connecting to the upstanding peripheral wall section and the housing forming wall section of the upper half. The upper and lower halves are unified together to form the main body unit of the cartridge.

20 Claims, 15 Drawing Sheets

DISC CARTRIDGE OF REDUCED SIZE

BACKGROUND OF THE INVENTION

1. Field of the Invention

This invention relates to a disc cartridge having housed therein a disc-shaped recording medium, such as an optical disc.

This application claims priority of Japanese Patent Application No. 2004-013603, filed on Jan. 21, 2004, the entirety of which is incorporated by reference herein.

2. Description of Related Art

Up to now, a disc cartridge, housing a disc-shaped recording medium, such as an optical disc, and loaded on a recording and/or reproducing apparatus with the disc-shaped recording medium rotatably housed therein, is in widespread use. With such disc cartridge, the disc-shaped recording medium is housed in a main body unit of the cartridge to protect the disc-shaped recording medium to assure facilitated lading/unloading of the disc for the recording and/or reproducing apparatus.

With this disc cartridge, in which the disc-shaped recording medium, housed in the main body unit of the cartridge, needs to be loadable on the recording and/or reproducing apparatus, the main body unit of the cartridge is provided with a driving opening for facing a turntable of a disc rotating driving mechanism for rotationally driving the disc-shaped recording medium, and with a recording and/or reproducing aperture for exposing a portion of the signal recording area of the disc-shaped recording medium to outside across the inner and outer rims thereof.

The disc cartridge is provided with a shutter member for opening/closing at least the recording and/or reproducing aperture for protecting the disc-shaped recording medium housed in the main body unit of the cartridge.

With this disc cartridge, the main body unit of the cartridge, housing the disc-shaped recording medium therein, is made up by upper and lower halves, molded from synthetic resin, and unified together by abutting and connecting the upper and lower halves together.

The disc cartridge, used as a recording medium for the recording and/or reproducing apparatus, is loaded on the recording and/or reproducing apparatus, with the lower surface of the main body unit of the cartridge as the loading reference surface. Thus, the lower half, defining the lower surface of the main body unit of the cartridge, is provided with a driving opening, a recording and/or reproducing aperture and a positioning hole engaged by a positioning pin provided to the recording and/or reproducing apparatus for setting the loading position. The outer rims of the upper and lower halves 3, 4 are provided with upstanding peripheral wall sections abutted to each other to form an outer peripheral wall section of the main body unit of the cartridge, and housing forming wall sections on the radially inner parts of the upstanding peripheral wall sections which, when abutted together, delimit a disc housing. These housing forming wall sections are formed in continuation or in non-continuation to the inner rim of the upstanding peripheral wall sections.

Meanwhile, with the disc-shaped recording medium, such as an optical disc, the tendency is to increase the recording density and to reduce the disc diameter in keeping up with the increased recording density. As the disc-shaped recording medium is reduced in size, the disc cartridge, housing the disc-shaped recording medium, also is to be reduced in size.

As the size of the disc cartridge is reduced, the disc cartridge is also reduced in thickness. Since the disc cartridge has to be reduced in size as the inner space for housing the disc-shaped recording medium is increased, attempts are being made to reduce the thickness of the upper and lower halves making up the main body unit of the cartridge.

The positioning holes, formed in the lower half, are formed in left-hand and right-hand areas, delimited between the housing forming wall sections and the upstanding peripheral wall sections, forming the outer peripheral wall. These areas are also reduced in thickness as is the planar surface of the lower half forming the bottom surface of the disc housing.

With the disc cartridge, reduced in size, the area delimited by the housing forming wall sections and the upstanding peripheral wall sections, is also small, such that the positioning holes are formed in proximity to the housing forming wall sections and the upstanding peripheral wall sections.

These positioning holes are engaged by positioning pins provided to the cartridge loading section of the disc recording and/or reproducing apparatus. The positioning holes are engaged by positioning pins by the disc cartridge being lowered from an elevated position onto the cartridge loading section. The disc cartridge is not lowered at this time in a horizontal position with respect to the cartridge loading section but is mostly lowered towards the cartridge loading section as the disc cartridge is inclined relative to the positioning pins. If the disc cartridge is lowered as it is inclined relative to the positioning pins, the risk is high that, as the positioning pins are engaged in the positioning holes, the distal ends of the positioning pins compress against and damage the housing forming wall sections or the upstanding peripheral wall sections. In particular, the distal ends of the positioning pins are tapered to provide for facilitated engagement thereof in the positioning holes. The housing forming wall sections or the upstanding peripheral wall sections may readily be damaged by contact with such positioning pins. With the disc cartridge, reduced in size, in which the housing forming wall sections or the upstanding peripheral wall sections are reduced in thickness as are other portions, these wall sections may readily be damaged by abutment against the positioning pins. In case the housing forming wall sections are damaged, the disc-shaped recording medium, housed in the disc housing, may not be protected properly.

In addition, as the distal ends of the positioning pins are engaged in the positioning holes, the risk is high that the thin-walled portions, carrying the positioning holes, tend to be deformed, with the result that the loading position cannot be set accurately.

The risk is also high that, in the course of the engagement of the positioning pins in the positioning holes, the positioning pins act strongly on the rim of the positioning holes, with the result that the main body unit of the cartridge may be subjected to damages, such as cracks.

With this in mind, the Patent Publication 1 discloses a solution in which a thick-walled portion is provided on the rim of the positioning holes. In the solution of the Patent Publication 1, only the rim of the positioning holes is provided with the thick-walled portion, so that it is not possible to assure sufficient strength of the vicinity of the positioning holes. In particular, it is difficult with this solution to assure sufficient strength of the main body unit of the cartridge, reduced in size and thickness, and to enable the disc cartridge to be loaded in position on the carridge loading section.

[Patent Publication 1] Japanese Laid-Open Patent Publication H-11-144424

SUMMARY OF THE INVENTION

It is an object of the present invention to provide a disc cartridge by which the aforementioned problems of the conventional disc cartridge may be resolved.

It is another object of the present invention to provide a disc cartridge in which sufficient strength may be assured as the disc cartridge is reduced in size and in thickness.

It is another object of the present invention to provide a disc cartridge in which the positioning holes may be correctly engaged by the positioning pins of the Recording and/or reproducing apparatus.

For accomplishing the above object, the present invention provides a disc cartridge comprising an upper half and a lower half abutted and connected to each other to form a main body unit of the cartridge for rotationally housing a disc therein, wherein there are formed an upstanding peripheral wall section on the outer periphery of the upper half, and an upstanding peripheral wall section on the outer periphery and the lower half, with the two upstanding peripheral wall sections being abutted to each other to form a peripheral wall section of the main body unit of the cartridge, there being formed a housing forming wall section on each of the inner surfaces of the upper and lower halves, the housing forming wall sections being abutted to each other to form a disc housing adapted to hold the disc therein. The lower half includes a first tubular section in one of areas delimited by the upstanding peripheral wall section and the housing forming wall section thereof, the first tubular section including a circular first positioning hole, the lower half also including a second tubular section in the other area, the second tubular section having an oblong second positioning hole, at least the second tubular section being formed in continuation to the upstanding peripheral wall section and/or the housing forming wall section of the lower half. The upper half includes tubular first and second abutment supports, abutted against the first and second tubular sections. At least the second abutment support is formed in continuation to the upstanding peripheral wall section and/or the housing forming wall section of the upper half. The upper and lower halves are unified together to form a main body unit of the cartridge by the upstanding peripheral wall sections and the housing forming wall sections thereof abutting against each other and by the first and second tubular sections compressing and abutting against the first and second abutment supports.

Preferably, the lower half includes a driving opening faced by rotation driving means adapted for rotationally driving the disc held in the disc housing, and a recording and/or reproducing aperture faced by recording and/or reproducing means for recording and/or reproducing the information for the disc.

Preferably, the first tubular section provided to the lower half is engaged with the tubular first abutment support provided to the upper half to prescribe an abutment reference position for the upper and lower halves.

Preferably, an abutment step abutting against the distal end of the first tubular section provided to the lower half is formed in the tubular second abutment support provided to the upper half.

Preferably, the upper and lower halves are formed of synthetic resin and the distal ends of the upstanding peripheral wall sections, abutted against each other, are welded together.

Preferably, the main body unit of the cartridge has a side opposite to a side provided with the first and second positioning holes, with the center of the disc in-between, as an inserting side into the disc recording and/or reproducing apparatus, and the lateral side corresponding to the inserting side is a substantially semicircular arcuate section with the center of the disc held in the main body unit of the cartridge as the center of the arc.

Preferably, the portions of the upstanding peripheral wall sections lying on the sides of the upper and lower halves form the outer peripheral wall section of the main body unit of the cartridge and a portion of the disc housing.

Preferably, the main body unit of the cartridge provided with the first and second positioning holes is a back side and the lateral surface of the back surface is a curved section having a curvature smoother than that of the arcuate section on the inserting side.

The present invention also provides a disc cartridge including a disc, an upper half and a lower half abutted and connected to each other to form a main body unit of the cartridge adapted for rotatably housing the disc therein, with the upper and lower halves each having an inserting end in the form of a substantially semi-circular arc, having the center of the disc as the center of the arc, and a back side opposite to the inserting end being curved with a curvature smoother than the curvature of the arc of the inserting end. There are formed an upstanding peripheral wall section on the outer periphery of the upper half, and an upstanding peripheral wall section on the outer periphery and the lower half, with the two upstanding peripheral wall sections being abutted to each other to form a peripheral wall section of the main body unit of the cartridge. There is formed a housing forming wall section on each of the inner surfaces of the upper and lower halves, with the housing forming wall sections being abutted to each other to form a disc housing adapted to hold the disc therein. The lower half includes a driving opening faced by rotation driving means adapted for rotationally driving the disc held in the disc housing, and a recording and/or reproducing aperture faced by recording and/or reproducing means for recording and/or reproducing the information for the disc. The lower half includes a first tubular section in one of areas delimited by the upstanding peripheral wall section and the housing forming wall section thereof. The first tubular section includes a circular first positioning hole. The lower half also includes a second tubular section in the other area, the second tubular section having an oblong second positioning hole, at least the second tubular section being formed in continuation to the upstanding peripheral wall section and/or the housing forming wall section of the lower half. The upper half includes tubular first and second abutment supports, abutted against the first and second tubular sections, at least the second abutment support being formed in continuation to the upstanding peripheral wall section and/or the housing forming wall section of the upper half. The upper and lower halves are unified together to form a main body unit of the cartridge by the upstanding peripheral wall sections and the housing forming peripheral wall section and/or the housing forming wall sections of the lower wall sections thereof abutting against each other and by the first and second tubular sections compressing and abutting against the first and second abutment supports.

With the disc cartridge according to the present invention, in which at least one of the first and second tubular sections, provided to the lower half, and carrying first and second positioning holes, is connected to the upstanding peripheral wall section and/or the housing forming wall sections, the tubular sections and the near-by portions thereof are increased in strength. Moreover, since the first and second tubular sections are abutted against the first and second abutment supports of the upper half, the positioning holes are deeper in depth. In addition, the first and second tubular sections may be maintained in the vertical positions relative to the plane of the main body unit of the cartridge to assure correct engagement in the positioning holes of the positioning pins provided to the disc recording and/or reproducing apparatus. The result is that loading with correct positioning on the disc recording and/or reproducing apparatus may be made with safe loading operation with the minimum risk of damages during loading.

According to the present invention, the strength of the positioning holes and the near-by portions may be assured, thus achieving strength and improved reliability of the disc cartridge.

Since the first tubular section, provided to the lower half, serves as a reference in prescribing the abutment reference position in abutting and connecting the upper and lower halves, the upper and lower halves may be connected to each other correctly without position deviations.

Moreover, according to the present invention, there is provided reference in prescribing the abutment reference position, while the upper and lower halves are formed of synthetic resin and the upstanding peripheral wall sections are welded and connected to each other, the disc cartridge, reduced in size, may be manufactured accurately and reliably.

Since the surface of the disc cartridge, inserted into the recording and/or reproducing apparatus, is a substantially semi-circular arcuate section, having the center of the disc-shaped recording medium, housed in the main body unit of the cartridge, as the center of the arc, the disc cartridge may further be reduced in size in keeping with the disc-shaped recording medium housed therein.

Other objects and specified advantages of the present invention will become more apparent from the following description especially when read in conjunction with the drawings.

DESCRIPTION OF THE PREFERRED EMBODIMENTS

A disc cartridge according to the present invention is now specifically explained with reference to the drawings.

Figure 1:
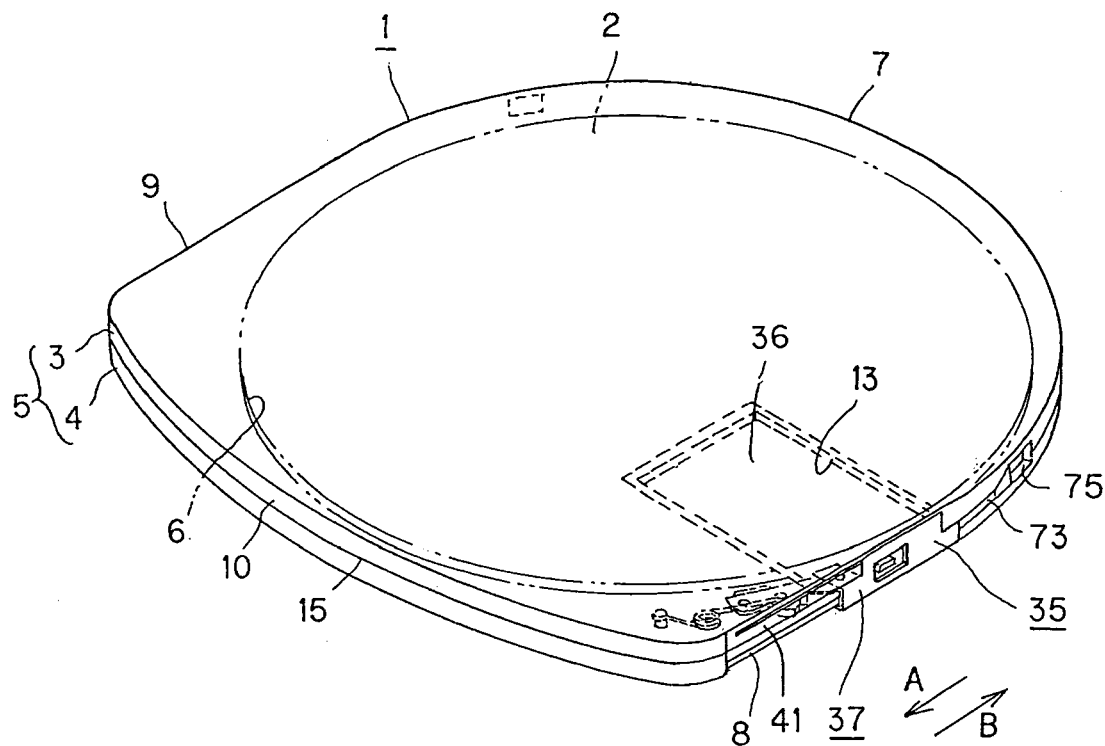
FIG. 1 is a perspective view of a disc cartridge according to the present invention, looking from an upper half side.
Figure 2:
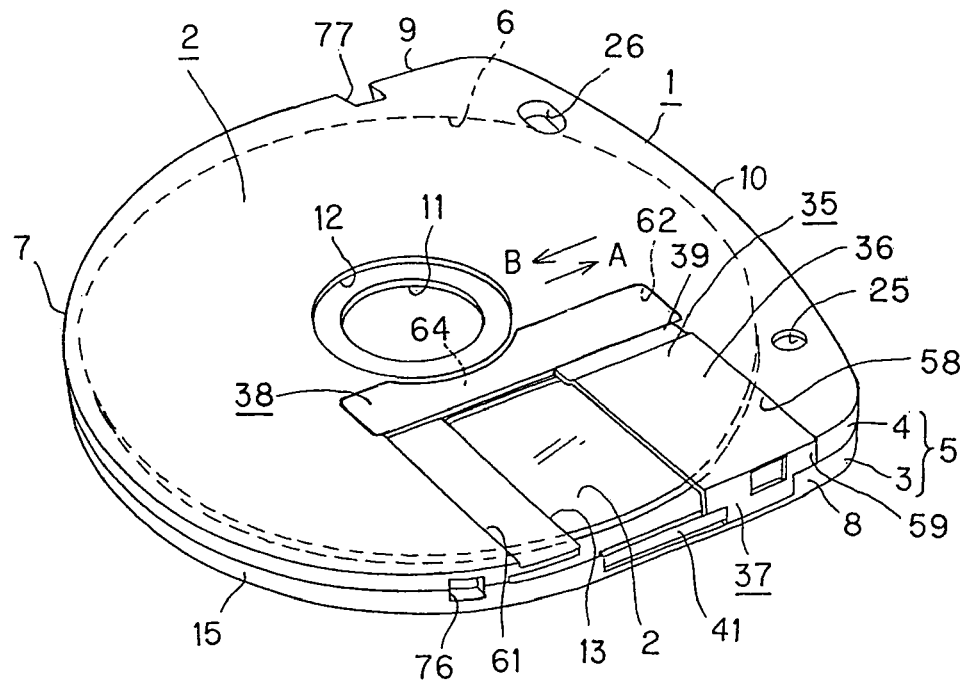
FIG. 2 is a perspective view of a disc cartridge according to the present invention, looking from a lower half side.

The disc cartridge 1 according to the present invention includes a disc-shaped recording medium, such as an optical disc 2, rotatably housed therein. Referring to FIGS. 1 and 2, the disc cartridge 1 includes a main body unit of the cartridge 5, made up by an upper half 3 and a lower half 4, abutted together as a pair, and has the optical disc 2 rotatably housed in the main body unit of the cartridge 5.

The disc cartridge 1 according to the present invention has housed therein the optical disc 2, having recorded thereon program data or video data for executing e.g. a TV game, and is formed to an extremely small size. The disc cartridge 1 has housed therein a small-sized disc, that is the optical disc 2, that can be held in the palm of a user's hand.

Figure 3:
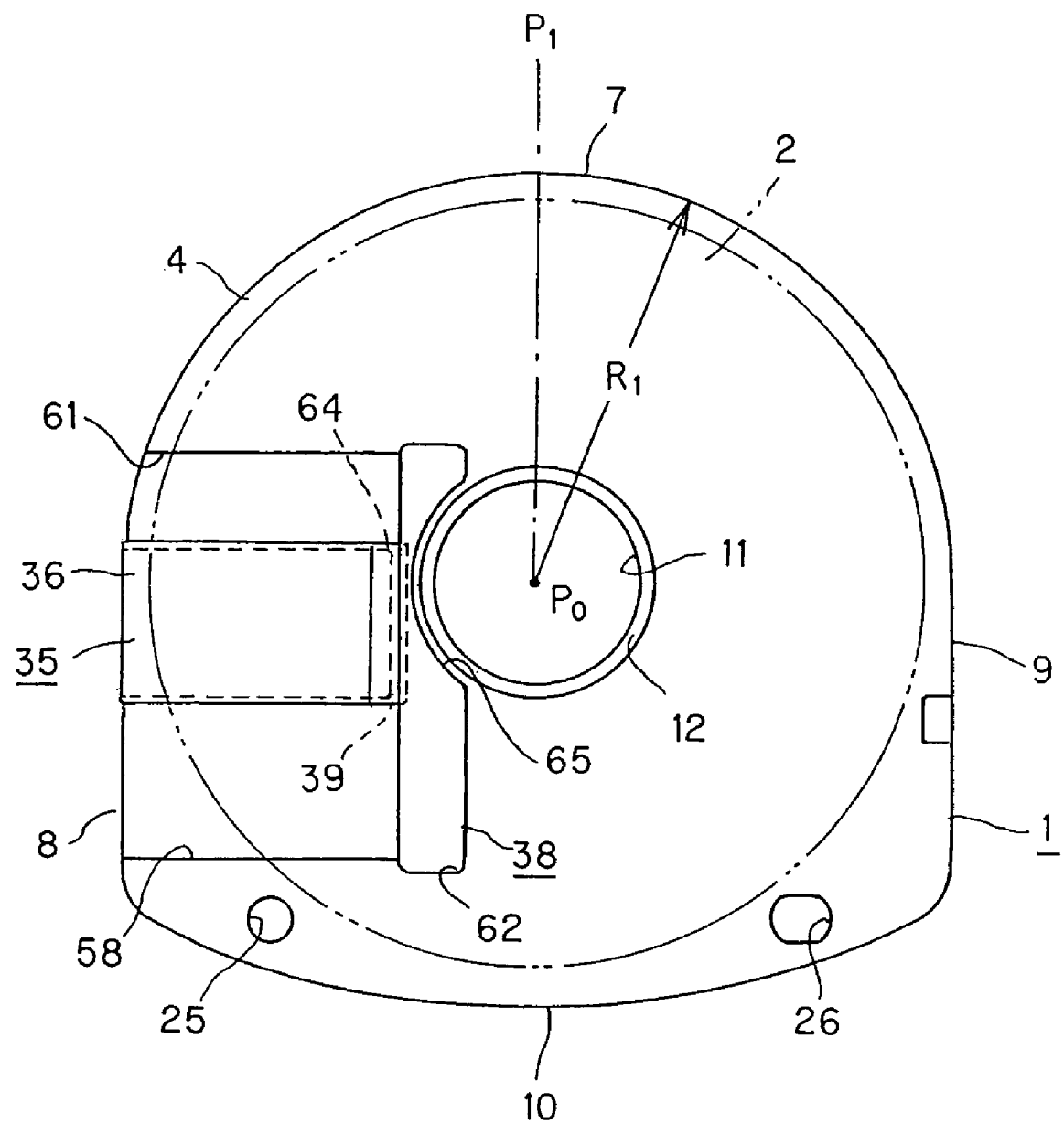
FIG. 3 is a perspective view of a disc cartridge according to the present invention, looking from the lower half side.

Referring to FIGS. 1 to 3, the main body unit of the cartridge 5, forming the disc cartridge 1, has its front side, as one of its lateral sides, operating as an inserting end into a disc recording and/or reproducing apparatus, formed as an arcuate section 7. The disc cartridge 1 is adapted for being introduced into and detached from the disc recording and/or reproducing apparatus. This arcuate section 7 is substantially of a semicircular profile, with a constant radius R1 about the center of the optical disc 2, housed in a disc housing section 6 of the main body unit of the cartridge 5, as a center P0, as shown in FIG. 2. That is, the arcuate section 7 is formed as a semicircle substantially in register with a semicircular portion of the optical disc 2 housed in the main body unit of the cartridge 5.

The opposing lateral sides of the main body unit of the cartridge 5, contiguous to the arcuate section 7, are formed as lateral sides 8, 9, while the back sides thereof, opposing to the arcuate section 7, are formed as a smoothly uniformly curved section 10.

With the disc cartridge 1 according to the present invention, the front side thereof, operating as an inserting side end, is formed as a substantially semi-circular arcuate section 7, curved more acutely than other sides, so that insertion thereof into a disc recording and/or reproducing apparatus via a cartridge inserting/ejecting opening in accordance with the slot-in system may be discerned extremely readily. In particular, in the case of the disc cartridge 1, reduced in size such that it can be held within the palm of the user's hand, the inserting direction thereof can be sensed by the hand feel when the disc cartridge is held with hand, such that the disc cartridge can be loaded correctly in the disc recording and/or reproducing apparatus as mistaken insertion is prevented from occurrence. In addition, the disc cartridge 1 can be inserted readily and reliably into the disc recording and/or reproducing apparatus of the slot-in system.

Moreover, the disc cartridge 1 according to the present invention has its inserting end side formed substantially as the semi-circular arcuate section 7, while having the back side opposing to the arcuate section 7 as the curved section 10, and hence the optical disc 2 housed therein may further be reduced in size.

The upper and lower halves 3, 4, making up the main body unit of the cartridge 5 by being abutted and connected together, are hereinafter explained in more detail.

The upper and lower halves 3, 4 used are prepared by molding a synthetic resin material, such as polycarbonate resin or ABS resin.

Figure 4:
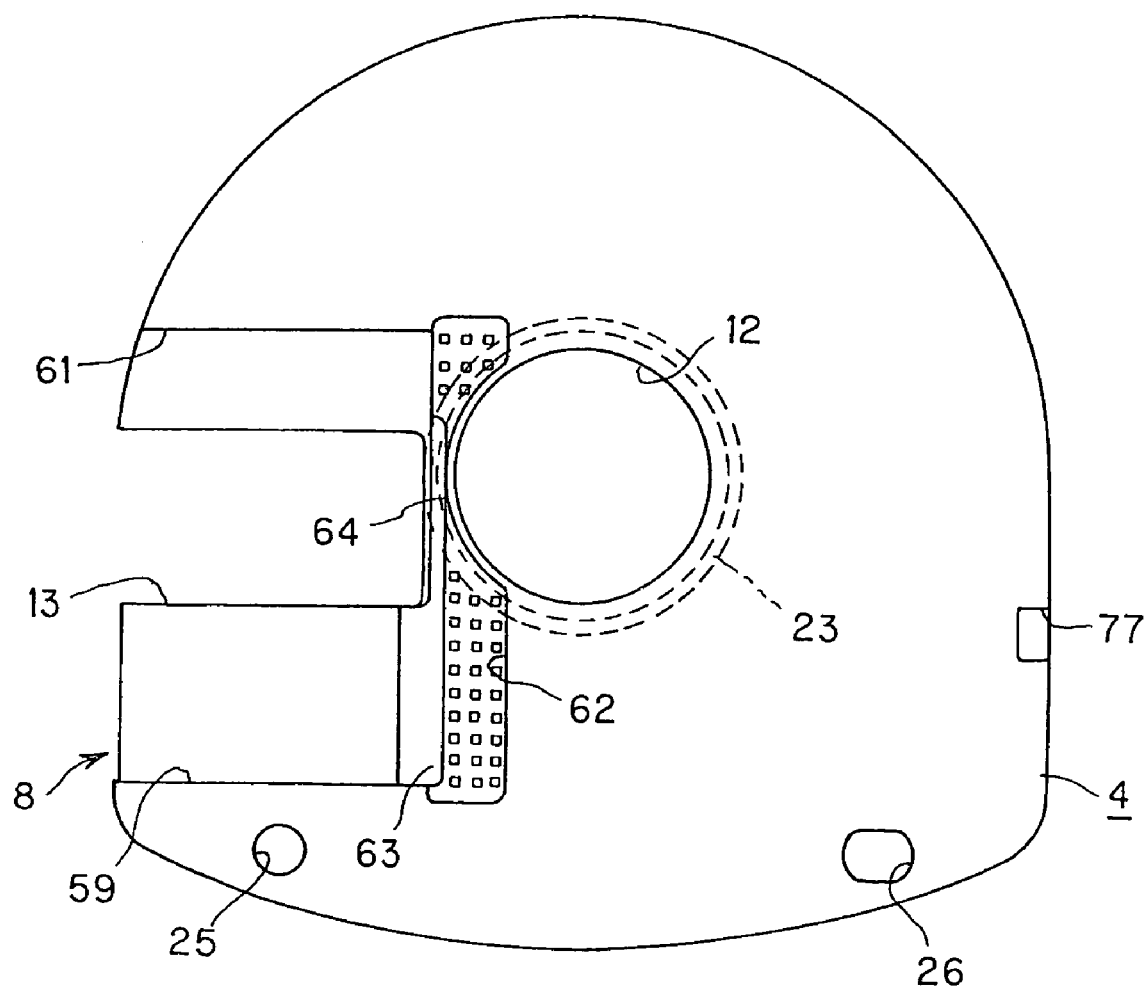
FIG. 4 is a plan view showing an outer surface of the lower half, forming a main body unit of the cartridge.
Figure 5:
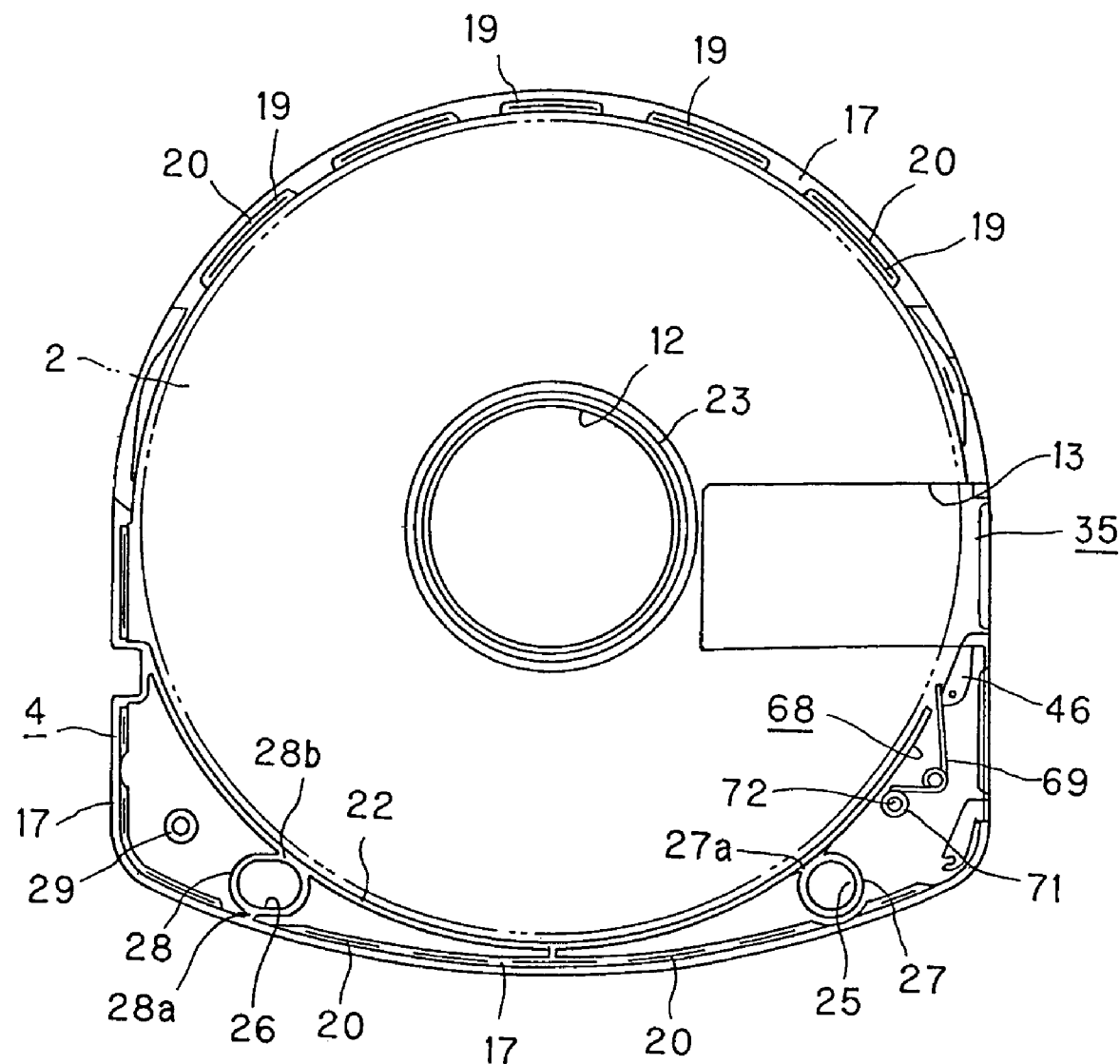
FIG. 5 is a plan view showing an inner surface of the lower half.

Referring to FIGS. 4 and 5, there is formed, in the center part of the lower half 4, forming the lower surface side of the main body unit of the cartridge 5, a circular center opening 12 for exposing a center opening 11 formed in the optical disc 2 housed in the main body unit of the cartridge 5 and a rim part of the center opening to outside. Into this center opening 12 is intruded e.g. a turntable forming a part of a disc rotating driving mechanism provided to the disc recording and/or reproducing apparatus on which to load the disc cartridge 1. That is, the center opening 12 operates as a driving opening into which is intruded a part of the mechanism for rotationally driving the optical disc 2.

Referring to FIGS. 2 to 5, an aperture for the head part 13, operating as a recording and/or reproducing aperture, is formed in the lower half 4. The aperture for the head part 13 is formed towards the lateral side 8 of the main body unit of the cartridge 5, and is extended from a site close to the center opening 12 up to the lateral side 8 as a rectangular aperture. That is, the aperture for the head part 13 is formed as a rectangle of a size sufficient to expose the portion of the signal recording area of the optical disc 2 to outside across the inner and outer rims of the disc. The aperture for the head part 13 is formed by opening the side thereof on the lateral side 8, as shown in FIG. 4. By opening the lateral side 8 of the aperture for the head part 13 in this manner, the scanning area of the head part may be extended up to the outermost rim of the optical disc 2, and hence the signal recording area of the optical disc 2 may be increased to increase the recording capacity thereof. Since the aperture for the head part 13 is not contiguous to the center opening 12 and is separated therefrom by a bridge-like connecting portion, thus assuring mechanical strength of the lower half 4.

The surface of the upper half 3 facing the optical disc 2 is a planar surface, not having e.g. an opening, as shown in FIG. 1. The upper half 3 is abutted and connected to the lower half 4 to form an upper surface of the main body unit of the cartridge 5.

Figure 6:
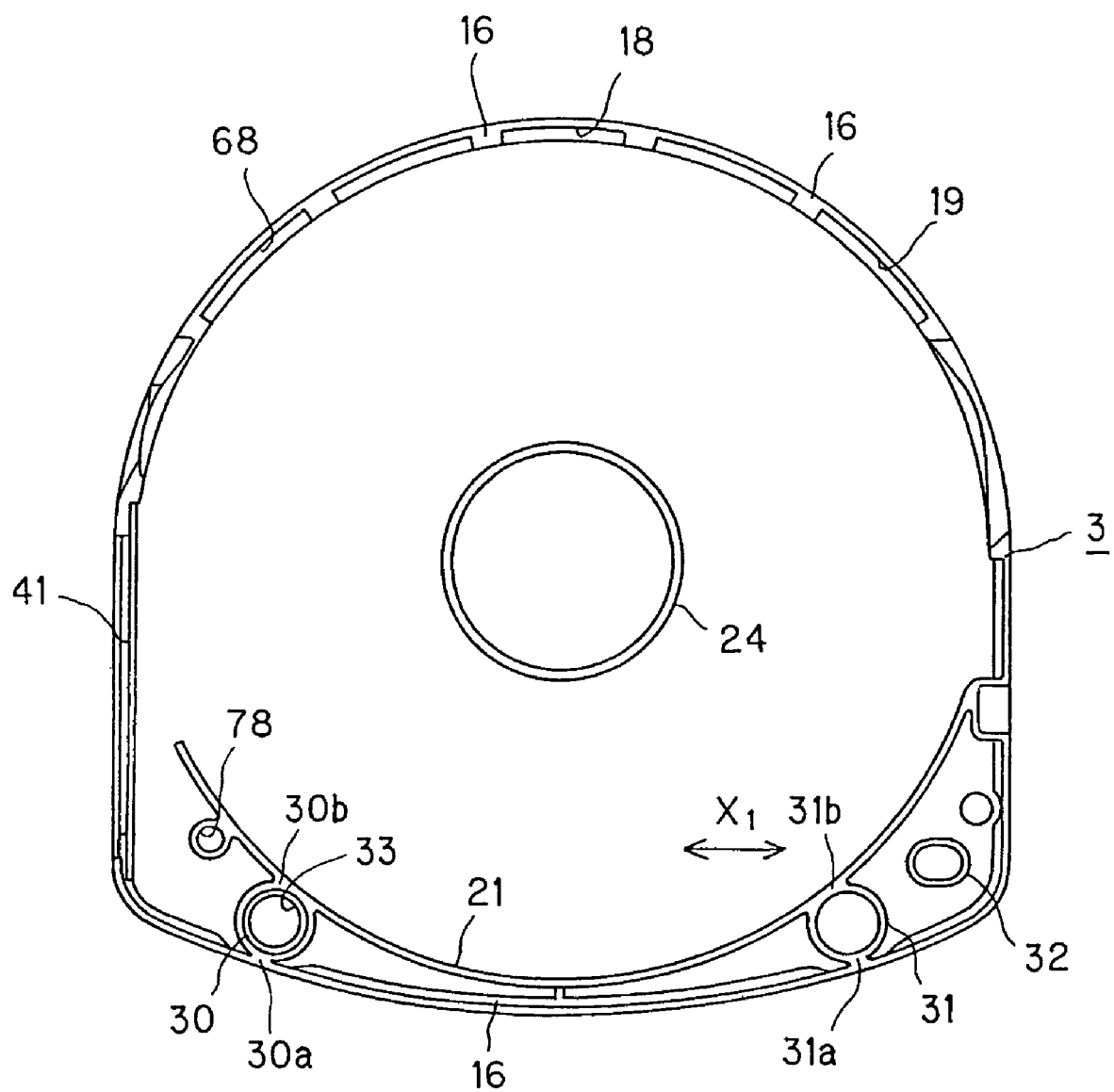
FIG. 6 is a plan view showing an inner surface of the upper half.

The abutting surface sides of the upper and lower halves 3, 4 are abutted and connected to each other to form upstanding peripheral wall sections 16, 17 which are abutted and connected to each other to form an outer peripheral wall section 15 of the main body unit of the cartridge 5. The upstanding peripheral wall sections 16, 17 are formed for extending along the outer rim parts of the upper and lower halves 3, 4, as shown in FIGS. 5 and 6. On the abutting surface sides of the semi-circular arcuate section 7 of the upper and lower halves 3, 4 of the peripheral wall sections 16, 17, there are formed plural engaging recesses 18 and plural mating engaging lugs 19. A set of the engaging recess 18 and the mating engaging lug 19 is formed at a most protuberant center position in the transverse direction of the arcuate section 7, and two sets of the engaging recesses 18 and the mating engaging lugs 19 are formed symmetrically in the left-and-right direction about the center set as center.

Figure 7:
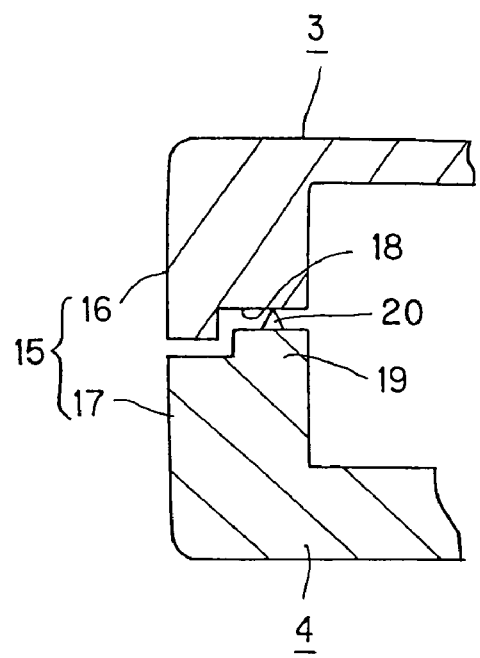
FIG. 7, showing the state of abutting the upper and lower halves together, is a cross-sectional view showing the state in which the upstanding peripheral wall sections of the upper and lower halves are abutted together.

The engaging recesses 18 are formed in the upper half 3, while the mating engaging lugs 19 are formed on the lower half 4. The engaging recesses 18 are formed by cutting off the inner rim side of the upstanding peripheral wall section 16 of the upper half 3. The mating engaging lugs 19 are formed on the distal end of the upstanding peripheral wall section 17 of the lower half 4. On the distal ends of the mating engaging lugs 19 are protuberantly formed welding ribs 20, as shown in FIG. 7.

Figure 8:
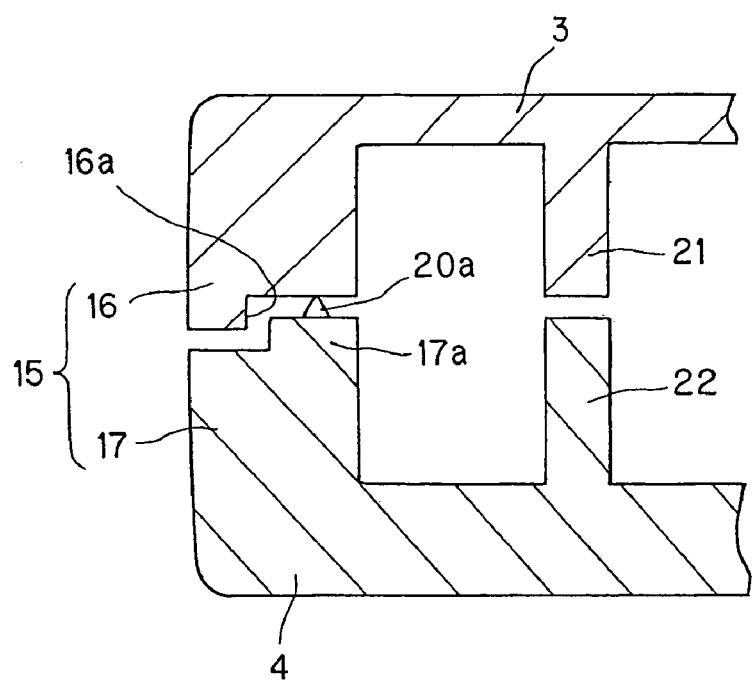
FIG. 8, showing the state of abutting the upper and lower halves together, is a cross-sectional view showing the state in which the upstanding peripheral wall sections and wall sections delimiting the housing section of the upper and lower halves are abutted together.

On the distal ends of the portions of the upstanding peripheral wall sections 16, 17 lying in the areas of the upper and lower halves 3, 4 forming the curved section 10 are formed engaging steps 16a and mating engaging lugs 17a, as shown in FIG. 8. The engaging steps 16a are provided on the upper half 3, while the engaging steps 16a are formed on the lower half 4. The engaging steps 16a are formed by cutting off the inner peripheral side of the upstanding peripheral wall section 16 of the upper half 3, while the mating engaging lugs 17a are formed on the distal end of the upstanding peripheral wall section 17 of the lower half 4. A welding web 20a is protuberantly formed on the distal end of the upstanding peripheral wall section 17, as shown in FIG. 8. A plural number of the welding ribs 20a are formed at a suitable spacing on the distal ends of the mating engaging lugs 17a, as shown in FIG. 5.

Figure 9:
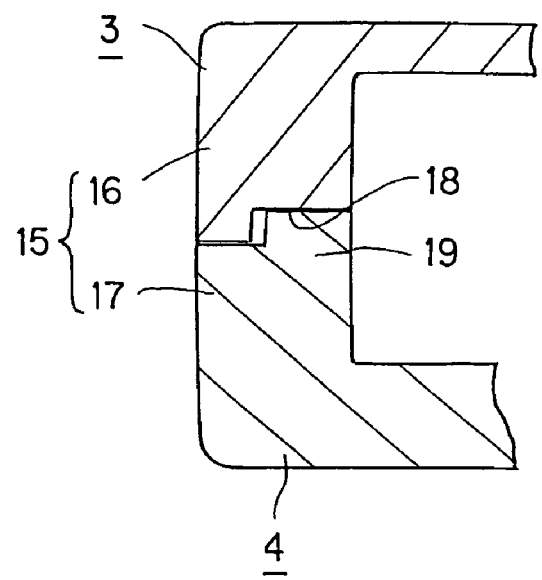
FIG. 9 is a cross-sectional view showing the state in which the upstanding peripheral wall sections of the upper and lower halves are unified together by being abutted and welded together.
Figure 10:
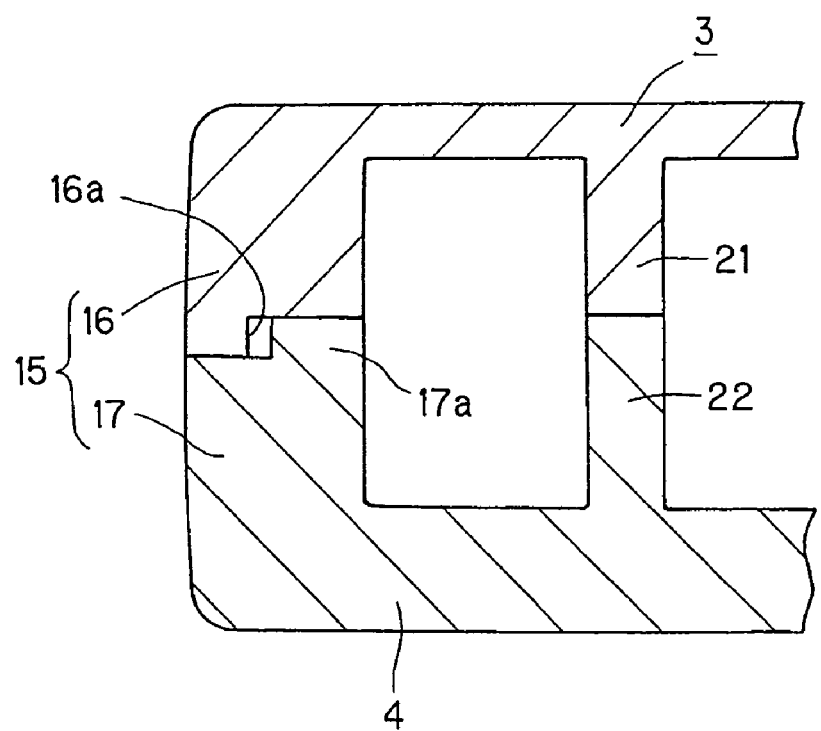
FIG. 10 is a cross-sectional view showing the state in which the upstanding peripheral wall sections of the upper and lower halves are abutted and welded together, with the housing section delimiting wall sections abutting against each other.

The upstanding peripheral wall sections 16, 17 are fused together to form outer peripheral wall section 15 by engaging the engaging recesses 18 with the mating engaging lugs 19, engaging and abutting the engaging steps 16a mating engaging lugs 17a with each other and by fusing the welding ribs 20, 20a together, as shown in FIGS. 9 and 10. The upstanding peripheral wall sections 16, 17 are fused together by applying ultrasonic waves to and thereby fusing the welding ribs 20, 20a.

On the inner surface sides of the upper and lower halves 3, 4, there are formed arcuate-shaped housing forming wall sections 21, 22, which are abutted against each other to delimit a disc housing section 6, as shown in FIGS. 5 and 6. These housing forming wall sections 21, 22 are formed on the back surface side forming the curved section 10 of the main body unit of the cartridge 5 and are formed to an arcuate profile in continuation to the upstanding peripheral wall sections 16, 17 forming the arcuate section 7 on the front side of the main body unit of the cartridge 5. The housing forming wall sections 21, 22 and the upstanding peripheral wall sections 16, 17 are abutted against one another to delimit the circular disc housing section 6. The housing forming wall sections 21, 22 and the upstanding peripheral wall sections 16, 17, formed for encircling the outer rim of the optical disc 2 housed within the disc housing section 6, regulate the housing section of the optical disc 2 housed in the housing section 6, while prohibiting the foreign matter from intruding into the disc housing section 6 to operate as a wall for protecting the optical disc 2.

On the inner surface of the lower half 4, facing the upper half 3, there is formed a ring-shaped disc supporting protrusion 23 for encircling the center opening 12, as shown in FIG. 5. On the inner surface of the upper surface 3, facing the lower half 4, there is similarly formed a ring-shaped disc supporting protrusion 24, as shown in FIG. 6. This disc supporting protrusion 24 is protruded at a position on the lower half 4 facing the disc supporting protrusion 23. These disc supporting protrusions 23, 24 carry a signal mo-recording area on the inner rim side of the optical disc 2 housed in the disc housing section 6 to prevent the signal recording area from directly contacting with the inner surfaces of the upper and lower halves 3, 4 to protect the optical disc 2.

Meanwhile, the ring-shaped disc supporting protrusion 24, formed on the upper half 3, is of a diameter slightly smaller than the disc supporting protrusion 23 formed on the lower half 4.

Figure 11:
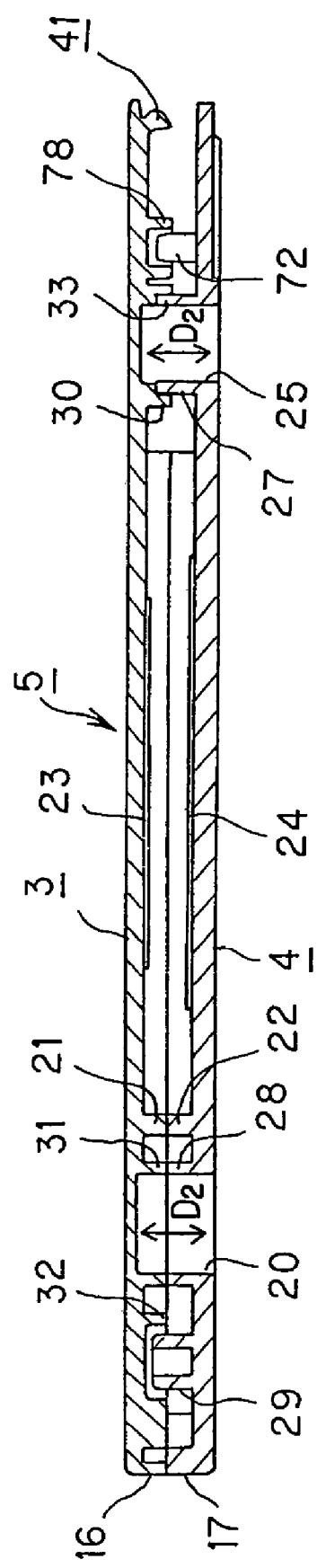
FIG. 11 is a cross-sectional view showing the state in which the upper and lower halves are abutted and connected to each other to form a main body unit of the cartridge.

The lower half 4 is provided with first and second tubular sections 27, 28, in which there are formed first and second positioning holes 25, 26, respectively. These positioning holes are adapted for being engaged by positioning pins provided to the disc recording and/or reproducing apparatus when the disc cartridge 1 is loaded on the disc recording and/or reproducing apparatus, as shown in FIGS. 5 and 11. These first and second tubular sections 27, 28 are formed provided on both back surface sides of the curved section 10, as shown in FIGS. 3 and 4. That is, the first and second tubular sections 27, 28 are formed in lest-hand and right-hand side areas encircled by back side upstanding peripheral wall section 17 forming the curved section 10 of the main body unit of the cartridge 5 and the housing forming wall section 22, as shown in FIG. 5.

The first and second positioning hole 25, provided to the first tubular section 27 is formed as an opening of a circular cross-section, in order that a mounting reference of the disc cartridge 1 to the cartridge mounting section maybe prescribed by the opening engaging with the positioning pin of the circular cross-section provided to the disc recording and/or reproducing apparatus. The first tubular section 27 is formed to a tubular form with a circular cross-section to the shape of the first positioning hole 25 formed therein. The second positioning hole 26 is formed as an oblong hole having a long diameter along the transverse direction across the lateral sides 8, 9 of the main body unit of the cartridge 5, in order that, when a positioning pin provided to the recording and/or reproducing apparatus is engaged in the second positioning hole 26, with the first positioning hole 25 as a reference, the engagement position of the positioning pin may be adjusted in its engagement position in the positioning hole 26, as shown in FIGS. 3 and 4. The second tubular section 28 is formed as a tube of an elliptical cross-section to the shape of the second positioning hole 26 formed therein.

An engagement lug 29 is provided in an area encircled by the housing forming wall section 22 and by the upstanding peripheral wall section 17 and including the second tubular section 28. The engagement lug 29 is provided closer to the upstanding peripheral wall section 17, forming the opposite side lateral surface 9 of the main body unit of the cartridge 5, than to the second tubular section 28, as shown in FIG. 5. That is, the engagement lug 29 is provided at a position remoter from the first tubular section 27 than the second tubular section 28, as shown in FIG. 5.

The first tubular section 27 and the second tubular section 28 form a first positioning part and a second positioning part for setting the abutting position for the upper and lower halves 3, 4, respectively.

The inner surface of the upper half 3 is provided with a first abutment support 30 for engaging with the first tubular section 27 provided to the lower half 4, and with a second abutment support 31 for abutment against the second tubular section 28. The first and second abutment supports 30, 31 are tubular in shape.

The upper half 3 is provided with an engagement support 32 engaged with the engagement lug 29.

It is noted that the first tubular section 27 and the engagement lug 29 are formed to a height of protruding from the distal end of the upstanding peripheral wall section 17, as shown in FIG. 11, so that, when the upstanding peripheral wall sections 16, 17 are abutted together to connect the upper and lower halves 3, 4 to each other, the first tubular section 27 and the engagement lug 29 are engaged in the first abutment support 30 and in the engagement support 32 which are formed to the same height as that of the upstanding peripheral wall section 16.

The second tubular section 28 is formed to the same height as that of the upstanding peripheral wall section 17, so that, when the upstanding peripheral wall sections 16, 17 are abutted together to connect the upper and lower halves 3, 4 to each other, the second tubular section 28 is engaged with second abutment support 31, the distal end of the which is formed to the same height as that of the upstanding peripheral wall section 16.

Meanwhile, the first abutment support 30 and the second abutment support 31, provided to the upper half 3, are provided in left-hand and right-hand side areas encircled by back side upstanding peripheral wall section 16 forming the curved section 10 of the main body unit of the cartridge 5 and the housing forming wall section 21, as shown in FIG. 6. The engagement support 32 is provided closer to the upstanding peripheral wall section 16, forming the opposite side lateral surface 9 of the main body unit of the cartridge 5, than to the second abutment support 31, as shown in FIG. 6.

When engaged with each other, the first tubular section 27 and the first abutment support 30 constitute a reference abutment position for the upper and lower halves 3, 4. That is, the upper half 3 is connected to the lower half 4 with the first tubular section 27, provided to the lower half 4, as a reference engagement position. Thus, the first tubular section 27 and the first abutment support 30 are formed to a diameter such that the two components have a tight fit with each other, as shown in FIG. 11. That is, the outer diameter of the first tubular section 27 is approximately equal to the inner diameter of the first abutment support 30 engaged by the distal end of the first tubular section 27.

In the inside of the first abutment support 30 is formed an abutment step 33, compressing against the distal end of the first tubular section 27, as shown in FIG. 11. The first tubular section 27 has its distal end abutted against the abutment step 33 for engagement with the first abutment support 30. Since the first abutment support 30 is formed in its inside with the abutment step 33, the base part side towards the planar side of the upper half 3 may be increased in thickness to improve mechanical strength.

The first abutment support 30 may be formed to tubular form a, with a uniform inner diameter, without providing an inner abutment step. In this case, the first tubular section 27 is carried by being abutted against the planar surface of the upper half 3.

The engagement support 32 is formed to an elliptical shape having the width-wise direction corresponding to the direction of an arrow X1 in FIG. 6 across the lateral sides 8, 9 of the main body unit of the cartridge 5, such that the engagement position of the engagement lug 29 along the transverse direction may be adjusted when the upper and lower halves 3, 4 are abutted against each other with the first tubular section 27 and the first abutment support 30 as reference.

Figure 12:
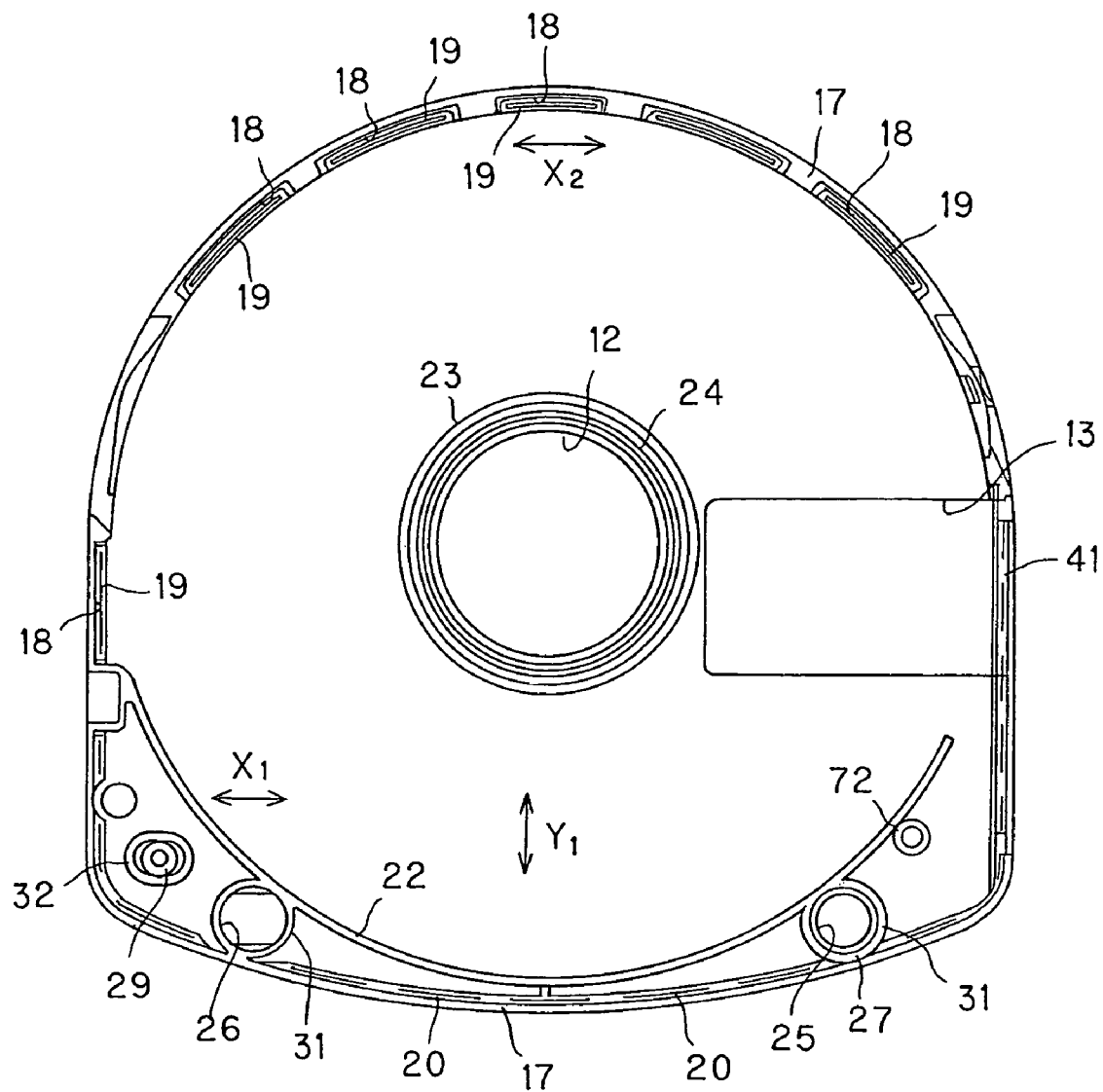
FIG. 12 is a plan view showing the portions of the upper and lower halves abutted and connected to each other.

In abutting and connecting the upper and lower halves 3, 4, constructed as described above, the lower half 4 is carried in position by a positioning jig and, as shown in FIG. 12, the first abutment support 30 of the upper half 3 is engaged with the first tubular section 27 of the first tubular section 27 of the lower half 4, while the engagement lug 29 of the lower half 4 is engaged with the engagement support 32 of the upper half 3, and the plural engaging recesses 18 of the upper half 3 are engaged with the plural mating engaging lugs 19 of the lower half 4 to abut the upstanding peripheral wall sections 16, 17 to each other.

The mating engaging lug 19, provided to a mid position at the most protuberant position of the arcuate section 7, out of the engaging lugs 19 of the lower half 4, engaged with the engaging recesses 18 of the upper half 3, is designed to act as a third positioning means for positioning along the direction of the arrow X2 along the arc of the arcuate section 7 when the upper and lower halves 3, 4 are abutted and connected to each other. The mating engaging lug 19, forming a third positioning means, is designed to leave a small gap when engaged in the engaging recesses 18 of the upper half 3. That is, the mating engaging lug 19, forming the third positioning means, and the engagement recess 18, engaged by this engaging lug 19, are formed to high precision as shown to give a small gap D1 to an enlarged scale in FIG. 13. That is, the mating engaging lug 19 and the engagement recess 18, engaged by this engaging lug 19, are formed to substantially the same widths W1, W2 to permit tight engagement therebetween. Since the engagement recess 18 is tightly engaged with the engaging lug 19, forming the third positioning means, the upper and lower halves 3, 4 are coupled to each other in position along the arc of the arcuate section 7.

The mating engaging lugs 19 and the engaging recesses 18, other than the engaging lug 19, forming the third positioning means, and the engaging recesses 18, engaged by this engaging lug 19, are sized to take up position deviation on engagement with each other. That is, the engaging lug 19 is smaller in size than the width of the engaging recesses 18, or the engaging recesses 18 is larger in size than the engaging lug 19.

The mating engaging lugs 19 and the engaging recesses 18 may be reversed in mounting positions thereof from each other. That is, the engaging lugs and the engaging recesses may be provided on the upper half 3 and on the lower half 4, respectively. In such case, the engaging recesses 18 provided to the lower half 4 operates as the thir positioning means.

The upper and lower halves 3, 4 are abutted against each other with the first tubular section 27 as an abutment reference position. The upper and lower halves 3, 4 are positioned in the fore-and-aft direction of the main body unit of the cartridge 5, in a direction of an arrow Y1 perpendicular to the width-wise direction indicated by arrow X1 in FIG. 12, by the engagement lug 29 engaging with the engagement support 32, whilst the abutment position against the arcuate section 7 as an inserting end to the disc recording and/or reproducing apparatus may be set by the engaging recesses 18 and the mating engaging lugs 19, operating as the third positioning means, engaging with each other.

The upper and lower halves 3, 4, thus abutted against each other in position, are unified together by fusing the welding ribs 20 provided to the distal end of the upstanding peripheral wall section 17, using an ultrasonic welding unit, to form the main body unit of the cartridge 5.

According to the present invention, the upper and lower halves 3, 4 are abutted and connected to each other, as the upper and lower halves 3, 4 are positioned at three points, that is, at the first and second positioning parts provided on both back surface sides of the curved section 10 of the main body unit of the cartridge 5, and at a third positioning part at the center of the front side arcuate section 7, so that the upper and lower halves 3, 4 may be mounted to high accuracy with the minimum phase deviation. In particular, since the first and second positioning parts are located on the outer rim of the main body unit of the cartridge 5, and are spaced apart at a larger distance from each other, the position deviation of the main body unit of the cartridge 5 may be reduced further to improve mounting precision further. The result is that the disc cartridge 1 employing this main body unit of the cartridge 5 is improved in mounting precision, so that the disc cartridge may be smoothly mounted to or dismounted from the recording and/or reproducing apparatus. In addition, the disc cartridge 1 employing this main body unit of the cartridge may be improved in appearance.

Moreover, with the disc cartridge 1, since the engagement lug 29, forming the second positioning unit on the lower half 4, is provided at a significant distance from the first tubular section 27, the position deviation in the abutment position of the upper and lower halves 3, 4 may be reduced further. In particular, deviation in the abutment position between the tubular second abutment support 31 and the second tubular section 28, formed around the second positioning hole 26, located between the first tubular section 27 and the engagement lug 29, may be reduced to achieve more reliable abutment.

Moreover, with the disc cartridge 1 according to the present invention, in which the upper and lower halves 3, 4 may be coupled to each other, as position deviation is suppressed from occurring, the housing forming wall sections 21, 22, provided to the upper and lower halves 3, 4, may also be abutted against each other as position deviation is suppressed from occurring, so that the disc housing section 6 may be formed to high accuracy. The result is that protrusions that may injure the optical disc 2 within the disc housing section 6 may be suppressed from being produced to enable reliable protection of the optical disc 2.

Additionally, with the disc cartridge 1 according to the present invention, in which the upstanding peripheral wall sections 16, 17 forming the outer peripheral wall section 15 of the main body unit of the cartridge 5 delimits the disc housing section 6, the disc cartridge 1 may further be reduced in size.

Meanwhile, with the disc cartridge 1 according to the present invention, the outer peripheral surface of the second tubular section 28, delimiting the second positioning hole 26 formed in the lower half 4, is connected via connecting portions 28a, 28b to the upstanding peripheral wall section 17 and to the housing forming wall sections 22 of the lower half 4, as shown in FIG. 5. By connecting the second tubular section 28 to the upstanding peripheral wall section 17 and to the housing forming wall section 22 in this manner, the second tubular section 28 and the near-by portion may be improved in strength. Since the second tubular section 28 is formed to the same height as that of and connected to the upstanding peripheral wall section 17 and the housing forming wall sections 22, it is possible to maintain verticality of the second tubular section 28 and to improve the strength of the portion of the lower half 4 carrying the second tubular section 28.

The outer peripheral surface of the first tubular section 27, provided to the lower half 4, carrying the first positioning hole 25, is connected to the housing forming wall sections 22 of the lower half 4 through a connection part 27a, as shown in FIG. 5. That is, even in case the first tubular section 27 is connected on only one side to the housing forming wall sections 22 the first tubular section 27 and its near-by portion may be improved in strength. It is noted that, since the first tubular section 27 is formed to a larger height than the housing forming wall sections 22, and is connected to this housing forming wall sections 22, as shown in FIG. 11, it is possible to maintain verticality of the first tubular section 27 to improve the strength of the first tubular section 27.

The outer peripheral surfaces of the first and second abutment supports 30, 31, on which are abutted the first and second tubular sections 27, 28, formed on the upper half 3, are connected, via connecting parts 30a, 30b, 31a and 31b to the upstanding peripheral wall section 16 and to the housing forming wall section 21 of the upper half 3, as shown in FIG. 6. By connecting the first and second abutment supports 30, 31 to the upstanding peripheral wall section 16 and to the housing forming wall section 21 in this manner, the first and second abutment supports 30, 31 and the near-by portion may be improved in strength. Since the first and second abutment supports 30, 31 are formed to the same height as that of and connected to the upstanding peripheral wall section 16 and the housing forming wall sections 21, it is possible to maintain verticality of the first and second abutment supports 30, 31 and to improve the strength of the portion of the upper half 3 carrying the first and second abutment supports 30, 31.

With the disc cartridge 1 according to the present invention, in which, when the upper and lower halves 3, 4 are abutted and connected to each other, the first and second tubular sections 27, 28 and the first and second abutment supports 30, 31 on the upper half side are abutted against one another to form continuous tubular sections, the depths D1 and D2 of the first and second positioning holes 25, 26, formed in the first and second tubular sections 27, 28, may be of a depth approximately equivalent to the thickness of the main body unit of the cartridge 5, as shown in FIG. 11. Moreover, since the first and second tubular sections 27, 28 and the first and second abutment supports 30, 31 on the upper half side are abutted against one another to form continuous tubular sections, the verticality with respect to the plane of the main body unit of the cartridge 5 may be maintained to realize correct engagement between the positioning pins on the side of the disc recording and/or reproducing apparatus and the first and second positioning holes 25, 26. The result is that the disc cartridge 1 may be loaded in position on the disc recording and/or reproducing apparatus, whilst safe loading may be achieved with minimum risk of occurrence of damages during loading.

In addition, since the portions of the disc cartridge 1 carrying the first and second positioning holes 25, 26 engaged by the positioning pins of the disc recording and/or reproducing apparatus are improved in strength, there is only little risk of injury to rim portions of the first and second positioning holes 25, 26 due to abutment of the positioning pins against such rim portions.

A shutter member 35 for opening/closing the aperture for the head part 13 is mounted to the main body unit of the cartridge 5, as shown in FIGS. 1 to 3. This shutter member 35 is formed by punching and bending a thin metal sheet or by forming a synthetic resin material. The shutter member 35 is made up by a rectangular flat-plate shutter part 36 sized large enough to cover up the aperture 13 and a cartridge support part 37 formed on the distal end of the shutter part 36, as shown in FIGS. 2 and 3. The distal end of the shutter part 36 is provided with a guide support part 39 carried by a shutter guide part 39 carried by the main body unit of the cartridge 5. The shutter guide part 39 is formed by bending the distal end of the shutter part 36 towards the main body unit of the cartridge 5, as shown in FIGS. 14 and 15.

Meanwhile, the shutter member 35 is carried for movement in the directions indicated by arrow A or B in FIGS. 1 and 2, for opening/closing the aperture 13, by having a slide guide part 41 carried by the cartridge support part 37. The slide guide part 41 is formed on the upper half 3 over a gamut of movement of the shutter member 35 adapted for opening/closing the aperture 13. This slide guide part 41 is formed in a portion of the upstanding peripheral wall section 16, provided to the upper half 3, and is designed for carrying the shutter member 35 within a range of the lateral side 8 of the main body unit of the cartridge 5.

Figure 14:
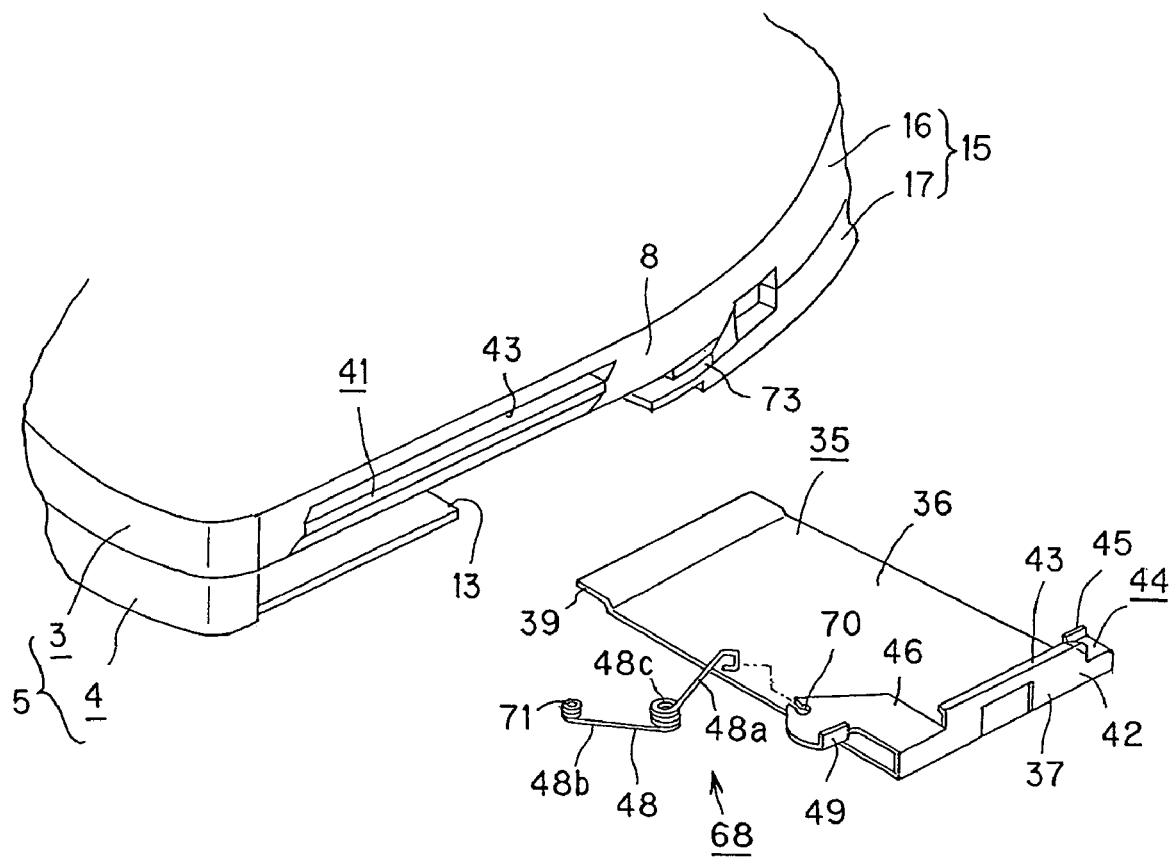
FIG. 14 is a perspective view showing a shutter member mounted to the main body unit of the cartridge, along with the main body unit of the cartridge.
Figure 15:
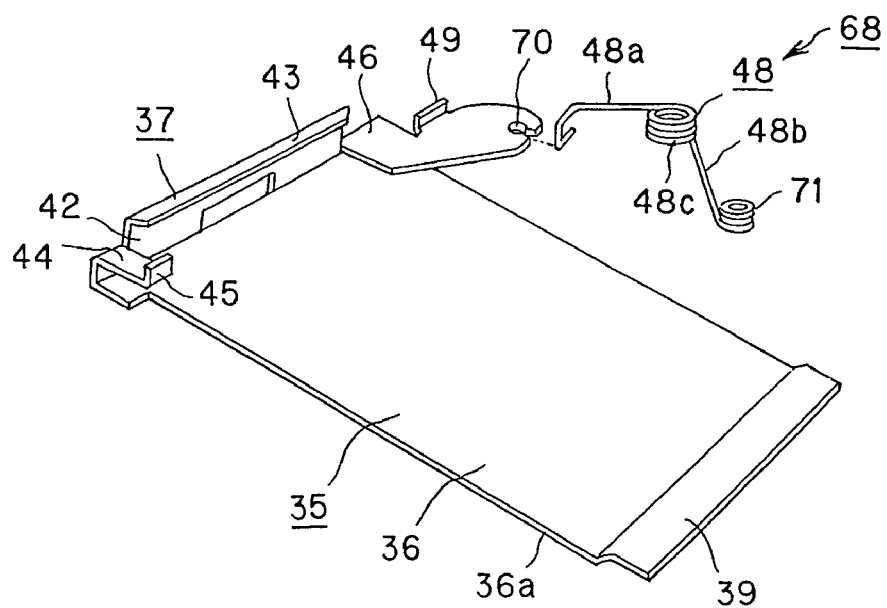
FIG. 15 is a perspective view showing the shutter member and a torsion coil spring biasing the shutter member.

The cartridge support part 37, provided to the shutter member 35, includes a connecting piece 42, formed upright from the proximal end of the shutter part 36, and a first support piece 43 is formed by bending the distal end of the connecting piece 42 towards the shutter part 36, as shown in FIGS. 14 and 15. On one side of the connecting piece 42, there is provided a second support piece 44 by bending the connecting piece in an L-shape at a location lower in height than the first support piece 43. The distal end of the second support piece 44 is bent to form an engagement piece 45 protruded towards the first support piece 43. On the opposite side of the connecting piece 42, there is formed a spring retention piece 46 for protruding towards the shutter part 36. The spring retention piece 46 is provided at the same height level as that of the second support piece 44.

This spring retention piece 46 is engaged by a portion of the torsion coil spring 48 forming a bi-directional biasing mechanism designed for selectively biasing the shutter member 35 mounted to the main body unit of the cartridge 5 in a direction of closing or opening the aperture 13.

On the proximal side of the spring retention piece 46, there is formed an engagement piece 49 projected towards the first support piece 43.

Figure 16:
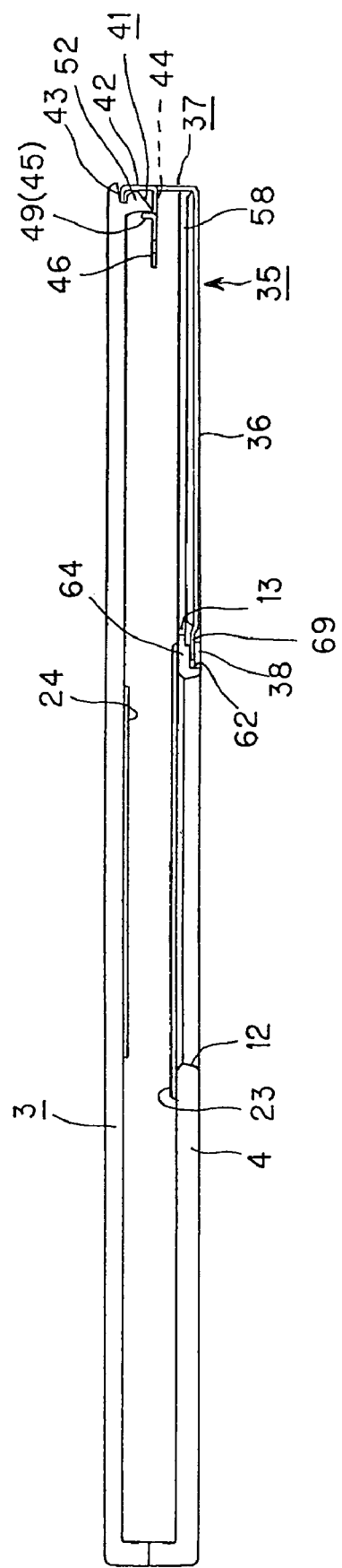
FIG. 16 is a cross-sectional view showing the state in which the shutter member has been mounted to the main body unit of the cartridge.

A slide guide unit 41 for movably carrying the shutter member 35 is formed as a part of the upstanding peripheral wall section 16, provided to the upper half 3, as shown in FIGS. 14 and 16. This slide guide unit 41 is made up by a guide groove 51, formed in the outer lateral side of the upstanding peripheral wall section 16, parallel to the movement direction of the shutter member 35, as shown in FIG. 14, and by a guide rail 52, carried by and between first and second support pieces 43, 44, as shown in FIG. 16.

The surface of the guide rail 52, facing outwards, is a surface perpendicular to the plane of the upper half 3, as shown in FIGS. 14 and 16. This surface faces the inner lateral surface of the connecting piece 42, forming the slide guide unit 41, and forms a first guide wall section 53, adapted for guiding the direction of movement of the shutter member 35. The inwardly facing surface of the guide rail 52 is a surface extending parallel to the first guide wall section 53. This surface faces the second support piece 44 and the spring retention piece 46 to form a second guide wall section 54 adapted for guiding the direction of movement of the shutter member 35. The distal end face of the guide rail 52 extends at right angles to the first and second guide wall sections 53, 54. This end face, facing the second support piece 44 and the spring retention piece 46, forms a third guide wall section 55 for guiding the direction of movement of the shutter member 35. The distal end side corner extending from the first guide wall section 54 to the second guide wall section 55 is formed as an inclined surface section 56. This inclined surface section 56 operates as a clearance area for such a case where the engagement pieces 45, 49 provided to the shutter member 35 are engaged with the second guide wall section 54 of the guide rail 52.

Figure 13:
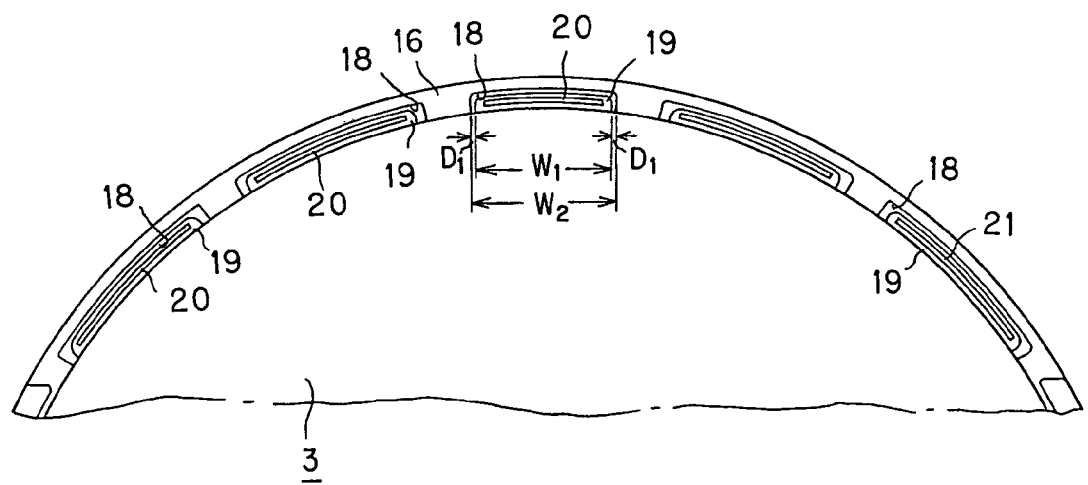
FIG. 13 is an enlarged plan view showing an engagement lug and a mating engagement recess formed on the distal ends of the upstanding peripheral wall sections of the upper and lower halves, respectively.

For having the shutter member 35 carried by the above-described slide guide unit 41, the shutter part 36 is arranged for extending on the aperture 13 formed in the lower half 4, and the cartridge support part 37 is engaged by the slide guide unit 41. For having the cartridge support part 37 carried by the slide guide unit 41, the first support piece 43 is engaged with the guide groove 51, and the engagement pieces 45, 49 are caused to face the second guide wall section 54. In this manner, the shutter member 35 is movably carried by the upper half 3, with the guide rail 52 being sandwiched between the first support piece 43, second support piece 44 and a portion of the spring retention piece 46, as shown in FIGS. 13 and 14.

With the slide guide unit 41, the connecting piece 42 faces the first guide wall section 53, and the engagement pieces 45, 49 face the second guide wall section 54, while the second support piece 44 and the spring retention piece 46 face the third guide wall section 55, so that movement of the shutter member 35 in its movement direction and in a direction perpendicular to the movement direction, that is, in a direction along the thickness of the main body unit of the cartridge 5 is prohibited. The result is that the shutter member 35 may be moved as it is guided by the slide guide unit 41, without experiencing any severe wobbling.

Figure 17:
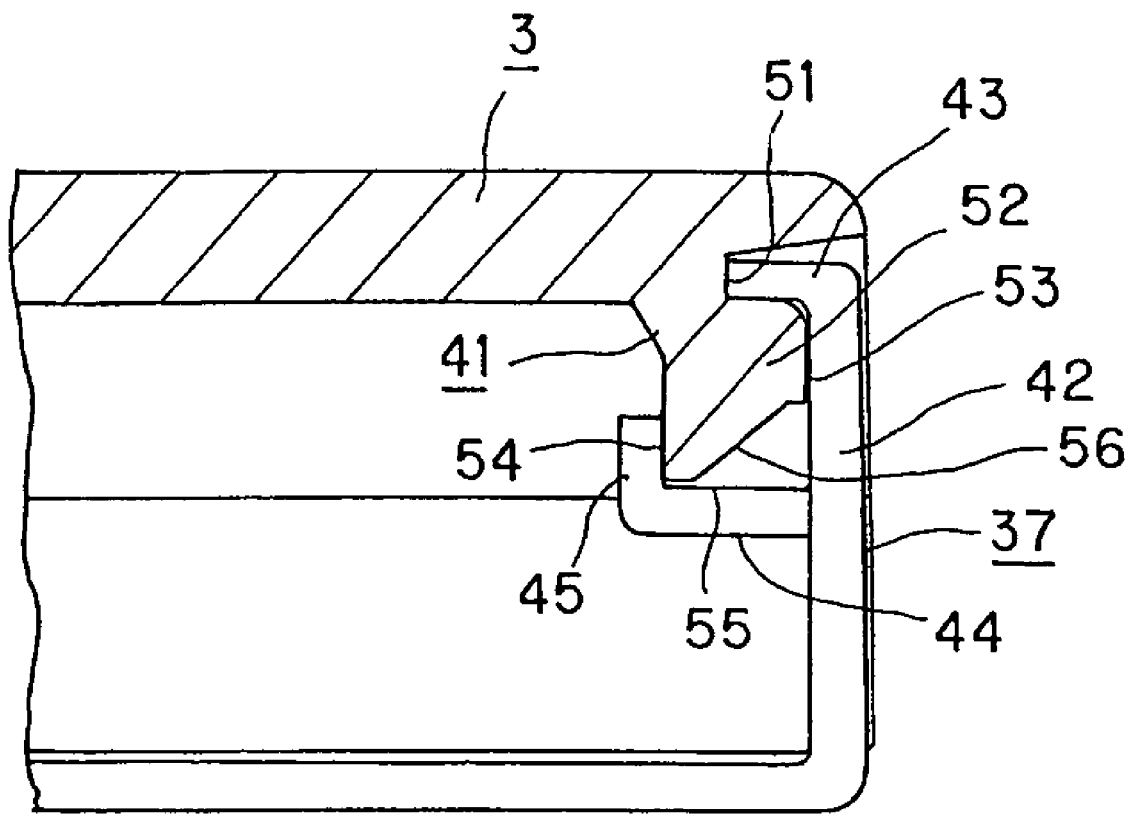
FIG. 17 is a cross-sectional view showing the state in which the shutter member has been carried by a slide guide part provided to the upper half.

Additionally, since the shutter member 35 is carried by the slide guide unit 41, formed on the distal end of the upstanding peripheral wall section 16, provided to the upper half 3, as shown in FIGS. 16 and 17, the planar surface side of the upper half 3, forming the upper surface side of the main body unit of the cartridge 5, may be opened wide apart, as shown in FIG. 1. That is, the shutter member 35 may be mounted to the main body unit of the cartridge 5, without having to expose the slide guide unit 41 partially on the planar surface side of the upper half 3.

Meanwhile, in the disc cartridge 1 according to the present invention, the shutter member 35 is mounted for not being protruded at least from the outer peripheral surface of the main body unit of the cartridge 5. Specifically, the shutter member 35 is mounted so as to be flush with the outer peripheral surface of the main body unit of the cartridge 5. To this end, a recessed shutter slide unit 58 is mounted so as to be flush with the outer peripheral surface of the main body unit of the cartridge 5. Thus, the recessed shutter slide unit 58 is formed in an area of the lower half 4 where the shutter member 35 is moved, as shown in FIGS. 2 and 3. The shutter slide unit 58 is of such a depth that the shutter part 36 is not protruded from the surface of the main body unit of the cartridge 5. On the lateral surface 8 of the main body unit of the cartridge 5, on which is moved the connecting piece 42 of the slide guide unit 41, there is formed a recess 59 for the slide unit continuing to the shutter slide unit 58. This recess 59 for the slide unit also is of such a depth that the connecting piece 42 is not protruded from the surface of the main body unit of the cartridge 5.

In the disc cartridge 1 of the present embodiment, a recess for the head part 61 is formed on the opposite side of the shutter slide unit 58, with the aperture 13 in-between, in continuation to the aperture 13, as shown in FIGS. 2 and 3. The recess for the head part 61 is used for allowing the head part of the disc recording and/or reproducing apparatus, loaded with the disc cartridge 1 according to the present invention, to approach further to the optical disc 2, and is formed to a depth deeper than the shutter slide part 59.

The disc cartridge 1 according to the present invention is provided with a shutter guide member 38 for supporting the shutter guide part 39, provided to the distal end of the shutter part 36, preventing the shutter part 36 from floating from the main body unit of the cartridge 5 and for assuring stable movement of the shutter member 35. The shutter guide member 38 is formed by punching a thin sheet member, and is formed of synthetic resin of the same type as the material of the upper and lower halves 3, 4, such as polycarbonate resin.

The shutter guide member 38 is used for carrying the slide guide unit 39 on the distal end side of the shutter part 36, adapted for opening/closing the aperture 13. Thus, the shutter guide member 38 is positioned on a plane outside of the lower half 4 forming the surface of the main body unit of the cartridge 5, between the circular center opening 12 and the aperture for the had part 13, and is formed to a length sufficient to carry the slide guide part 39 at least across the range of movement of the shutter member 35.

The shutter guide member 38 is mounted to the main body unit of the cartridge 5, as the guide support part 39, formed at the distal end of the shutter part 36, is intruded into a slide recess 63 for the slide part and as the guide support part 39 is carried by the shutter guide member 38 provided within a shutter guide member mounting recess 62.

With the disc cartridge 1 according to the present invention, in which the main body unit of the cartridge 5 may be formed to high accuracy, the shutter member 35, mounted to the main body unit of the cartridge 5, may be moved in stability relative to the main body unit of the cartridge 5, thereby reliably opening/closing the aperture for the head part 13.

In the above-described disc cartridge 1, the shutter member 35 is carried by the upper half 3 for opening/closing the aperture for the head part 13 of the lower half 4. Since the upper and lower halves 3, 4 are coupled together in a manner free from position deviation, the aperture 13 in the lower half 4 may be reliably opened/closed by the shutter member 35 carried by the upper half 3.

The disc cartridge 1 according to the present invention is provided with a bi-directional biasing mechanism 68 for causing reliable movement of the shutter member 35 opening/closing the aperture 13 and for reliably holding the shutter member 35 in the position closing the aperture 13 or in the position opening the aperture 13. This bi-directional biasing mechanism 68 has the function of biasing the shutter member 35 into movement for opening the aperture 13 or that for closing the aperture 13, and constitutes a shutter opening/closing mechanism.

Figure 18:
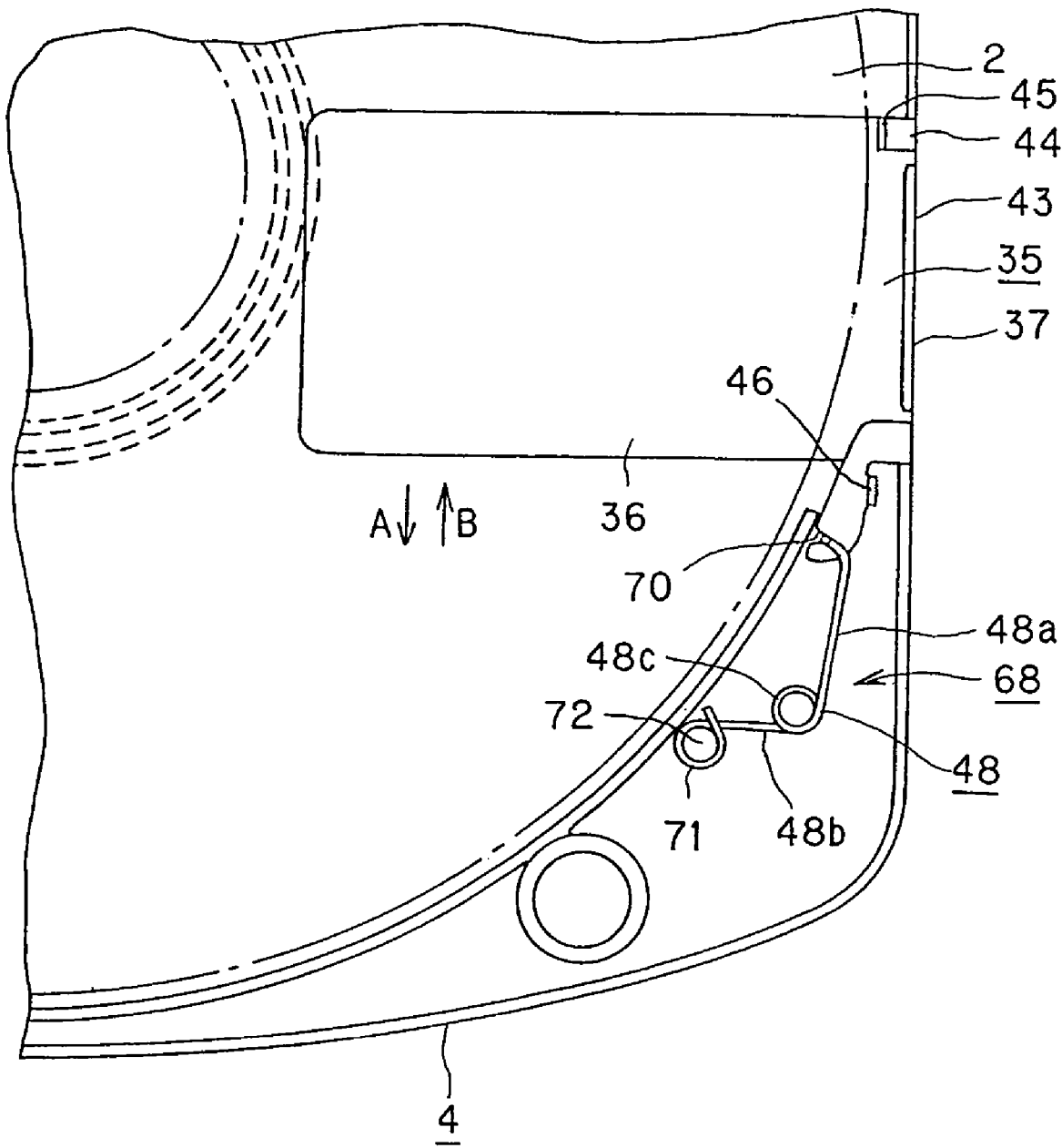
FIG. 18 shows a shutter member biased in the opening/closing direction by a two-directional biasing mechanism, and specifically shows the shutter member with an opening for the head part closed.

This bi-directional biasing mechanism 68 is formed by employing a bi-directional biasing member for selectively biasing the shutter member 35 in two directions, that is, in a direction of opening the aperture and in a direction of closing the aperture. Specifically, the bi-directional biasing member is a torsion coil spring 48, as shown in FIGS. 14, 15 and 18. The torsion coil spring 48 is mounted between the shutter member 35 and the main body unit of the cartridge 5. This torsion coil spring 48 is mounted at such a position that the shutter member 35 is thereby moved in the direction of opening the aperture for the head part 13, as shown in FIG. 18. That is, the torsion coil spring 48 is mounted on an upstream side such that the shutter member 35 is thereby moved in the direction of opening the aperture 13, from the position closing the aperture.

The torsion coil spring 48, forming the bi-directional biasing mechanism 68, is mounted by having the distal end of one arm 48*a* retained by an engaging part 70 formed on the distal end of the spring retention piece 46 and by having a ring part 71 engaged by a support pin 72 protuberantly formed on the inner surface of the lower half 4. the ring part 71 is provided to the distal end of the other arm 48*b*.

The upper half 3 is provided with a tubular engaging part 78, in register with a support pin 72 of the lower half 4, so as to be engaged by the distal end of the support pin 72. This engaging part 78 is engaged by the support pin 72 to prevent detachment of the ring part 71 of the torsion coil spring 48 engaged with the support pin 72.

When the shutter member 35 is in the position of closing the aperture for the head part 13, the torsion coil spring 48 biases the shutter member in the direction indicated by arrow B in FIG. 18, in order to maintain the closed state of the aperture for the head part 13. When the disc cartridge 1 is loaded on the disc recording and/or reproducing apparatus, and the shutter member 35 is moved in the direction indicated by arrow A in FIG. 18 for opening the aperture for the head part 13 relative to the main body unit of the cartridge 5, the position of a coil part, formed at a non-fixed mid position, is moved in the direction indicated by arrow A corresponding to the direction of movement of the shutter member 35 when the coil part 48*c* is moved further in the direction indicated by arrow A in FIG. 18, such that the coil part surpasses the position of the support pin 72 lying along the direction of movement of the shutter member 35, the biasing direction of the torsion coil spring 48 is reversed. When reversed in its biasing direction, the torsion coil spring 48 biases the shutter member 35 into movement in a direction indicate by arrow A in FIG. 17. That is, the torsion coil spring 48 biases the shutter member 35 into movement in the direction of arrow A in FIG. 17 and is moved in the direction of arrow A of opening the aperture for the head part 13, as shown in FIG. 19, in order to maintain the aperture for the head part 13 in an opened position.

Figure 19:
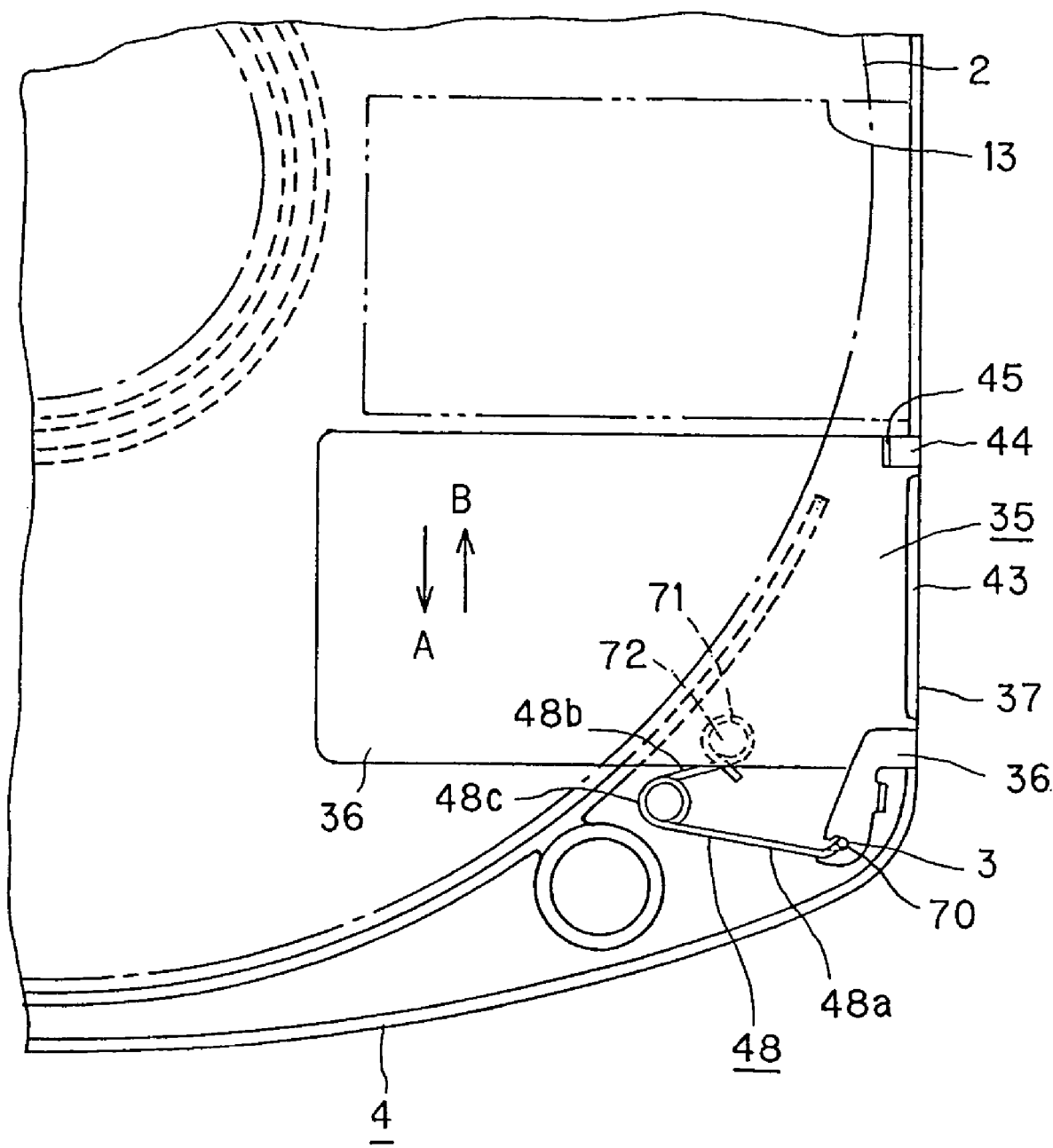
FIG. 19 is a plan view showing the opening for the head part closed by the shutter member.

When the operation of taking out, that is ejecting, the disc cartridge 1, in which the shutter member 35 has held the aperture for the head part 13 in the opened position, is performed, the shutter member 35 is moved relative to the main body unit of the cartridge 5, in the direction of arrow B in FIG. 19. The mid coil part 48*c* also is moved in the same direction indicated by arrow B. When the shutter member 35 is moved further in the direction indicated by arrow B, and the coil part 48*c* has surpassed the position of the support pin 72, located in the movement direction of the shutter member 35, the biasing direction of the spring is reversed. When the biasing direction is reversed, the torsion coil spring 48 biases the shutter member 35 into movement in the direction indicated by arrow B in FIG. 18. Thus, the shutter member is moved in the direction of closing the aperture for the head part 13 to maintain the aperture for the head part 13 in the closed state.

The shutter member 35, biased in this manner by the torsion coil spring 48 forming the bi-directional biasing mechanism 68 is supported in the position of closing the aperture for the head part 13 or in the position of opening the aperture for the head part 13, under the bias force of the torsion coil spring 48, so that the aperture for the head part 13 may be reliably maintained in the closed position or in the open position.

With the above-described disc cartridge 1, the shutter member 35 is maintained in the position of closing the aperture for the head part 13 by the torsion coil spring 48 forming the bi-directional biasing mechanism 68. A shutter member lock mechanism may be provided in which a lock lever rotationally biased by a spring is provided to the spring retention piece 46 of the shutter member 35. This lever may be turned in association operatively with the loading/unloading of the disc cartridge 1 to or from the disc recording and/or reproducing apparatus to lock or unlock the shutter member 35.

In the lateral surface of the main body unit of the cartridge 5 of the disc cartridge 1 according to the present invention, carrying the shutter member 35, there is formed a guide groove 73, into which is intruded a shutter member releasing piece, provided to the disc recording and/or reproducing apparatus, as shown in FIGS. 1 and 14.

In the opposing lateral surfaces 8 and 9 of the arcuate section 7 of the main body unit of the cartridge 5, there are formed engaging recesses 75, 76 for loading, engaged by portions of a cartridge loading mechanism of the disc recording and/or reproducing apparatus, on which is loaded the disc cartridge 1, as shown in FIGS. 1 and 2.

The lateral surface 9 of the main body unit of the cartridge 5, there is formed an engagement recess 77 for ejection, engaged by a portion of the ejection mechanism provided to the disc recording and/or reproducing apparatus, as shown in FIG. 2.

In the lateral surfaces 8, 9 or in the bottom surface of the main body unit of the cartridge 5, there is formed a discrimination opening or recess for discriminating the sort of the optical disc 2 housed therein.

In the foregoing explanation, the present invention is applied to a disc cartridge having a semicircular inserting end to reduce the size. The present invention is, however, not limited to the above-described disc cartridge and may, for example, be applied to a disc cartridge having a rectangular-shaped main body unit of the cartridge or to a disc cartridge having a recording and/or reproducing aperture in each of the upper and lower surfaces of the main body unit of the cartridge with similar merits to those obtained with the above-described embodiments.

The disc-shaped recording medium is not limited to the optical disc. The present invention may be applied to a disc cartridge having housed therein any other suitable disc-shaped recording mediums, including magnetic discs, with merits comparable to those described above.

What is claimed is:

1. A disc cartridge, comprising:
   an upper half and a lower half abutted and connected to each other to form a main body unit of the cartridge for rotationally housing a disc therein; wherein
   said disc cartridge includes an upstanding peripheral wall section formed on the outer periphery of the upper half, and an upstanding peripheral wall section formed on the outer periphery and the lower half, with the two upstanding peripheral wall sections being abutted to each other to form a peripheral wall section of the main body unit of the cartridge, there being formed a housing forming wall section on each of the inner surfaces of the upper and lower halves, said housing forming wall sections being abutted to each other to form a disc housing adapted to hold the disc therein;

said lower half including a first tubular section in one of areas delimited by said upstanding peripheral wall section and said housing forming wall section thereof, said first tubular section including a circular first positioning hole, said lower half also including a second tubular section in the other area, said second tubular section having an oblong second positioning hole, at least said second tubular section being formed in continuation to said upstanding peripheral wall section and said housing forming wall section of said lower half;

said upper half including tubular first and second abutment supports, abutted against said first and second tubular sections, at least said second abutment support being formed in continuation to said upstanding peripheral wall section and said housing forming wall section of said upper half;

said upper and lower halves being unified together to form a main body unit of the cartridge by said upstanding peripheral wall sections and said housing forming wall sections thereof abutting against each other and by said first and second tubular sections compressing and abutting against said first and second abutment supports.

2. The disc cartridge according to claim 1, wherein said lower half includes a driving opening faced by rotation driving means adapted for rotationally driving the disc held in said disc housing, and a recording and/or reproducing aperture faced by recording and/or reproducing means for recording and/or reproducing the information for said disc.

3. The disc cartridge according to claim 1, wherein said first tubular section provided to said lower half is engaged with the tubular first abutment support provided to said upper half to prescribe an abutment reference position for said upper and lower halves.

4. The disc cartridge according to claim 3, wherein an abutment step abutting against the distal end of the first tubular section provided to the lower half is formed in the tubular second abutment support provided to said upper half.

5. The disc cartridge according to claim 3, wherein said upper and lower halves are formed of synthetic resin and wherein the distal ends of said upstanding peripheral wall sections, abutted against each other, are welded together.

6. The disc cartridge according to claim 1, wherein said main body unit of the cartridge has a side opposite to a side provided with said first and second positioning holes, with the center of the disc in-between, as an inserting side into the disc recording and/or reproducing apparatus, and wherein the lateral side corresponding to said inserting side is a substantially semicircular arcuate section with the center of the disc held in the main body unit of the cartridge as the center of the arc.

7. The disc cartridge according to claim 6, wherein the portions of said upstanding peripheral wall sections lying on the sides of said upper and lower halves form the outer peripheral wall section of said main body unit of the cartridge and a portion of said disc housing.

8. The disc cartridge according to claim 6, wherein the side of said main body unit of the cartridge provided with said first and second positioning holes is a back side and wherein the lateral surface of said back surface is a curved section having a curvature smoother than that of the arcuate section on the inserting side.

9. A disc cartridge, comprising:
a disc;
an upper half and a lower half abutted and connected to each other to form a main body unit of the cartridge adapted for rotatably housing said disc therein; said upper and lower halves each having an inserting end in the form of a substantially semi-circular arc, having the center of the disc as the center of the arc, and a back side opposite to said inserting end being curved with a curvature smoother than the curvature of the arc of the inserting end;

an upstanding peripheral wall section formed on the outer periphery of the upper half, and an upstanding peripheral wall section formed on the outer periphery and the lower half, with the two upstanding peripheral wall sections being abutted to each other to form a peripheral wall section of the main body unit of the cartridge, there being formed a housing forming wall section on each of the inner surfaces of the upper and lower halves, said housing forming wall sections being abutted to each other to form a disc housing adapted to hold the disc therein;

said lower half includes a driving opening faced by rotation driving means adapted for rotationally driving the disc held in said disc housing, and a recording and/or reproducing aperture faced by recording and/or reproducing means for recording and/or reproducing the information for said disc;

said lower half including a first tubular section in one of areas delimited by said upstanding peripheral wall section and said housing forming wall section thereof, said first tubular section including a circular first positioning hole, said lower half also including a second tubular section in the other area, said second tubular section having an oblong second positioning hole, at least said second tubular section being formed in continuation to said upstanding peripheral wall section and said housing forming wall section of said lower half;

said upper half including tubular first and second abutment supports, abutted against said first and second tubular sections, at least said second abutment support being formed in continuation to said upstanding peripheral wall section and said housing forming wall section of said upper half;

said upper and lower halves being unified together to form a main body unit of the cartridge by said upstanding peripheral wall sections and said housing forming wall sections thereof abutting against each other and by said first and second tubular sections compressing and abutting against said first and second abutment supports.

10. The disc cartridge according to claim 9, wherein said first tubular section provided to said lower half is engaged with the tubular first abutment support provided to said upper half to prescribe an abutment reference position for said upper and lower halves.

11. The disc cartridge according to claim 9, wherein an abutment step abutting against the distal end of the first tubular section provided to the lower half is formed in the tubular second abutment support provided to said upper half.

12. The disc cartridge according to claim 9, wherein said upper and lower halves are formed of synthetic resin and wherein the distal ends of said upstanding peripheral wall sections, abutted against each other, are welded together.

13. A disc cartridge, comprising:
a lower half including
an upstanding peripheral wall section formed on the outer periphery of the lower half, a housing forming wall section on the inner surface of the lower half, a first tubular section in a first area delimited by said upstanding peripheral wall section of the lower half and said housing forming wall section of the lower half, said first tubular section including a circular first positioning hole, and a second tubular section in a second area delimited by said upstanding peripheral wall section of the lower half and said housing forming wall section of the lower half, said second tubular section having an oblong second positioning hole and being formed in continuation to said upstanding peripheral wall section of said lower half and said housing forming wall section of said lower half; and an upper half including an upstanding peripheral wall section formed on the outer periphery of the upper half, a housing forming wall section on the inner surface of the upper half, and tubular first and second abutment supports, abutted against said first and second tubular sections, said second abutment support being formed in continuation to said upstanding peripheral wall section of said upper half and said housing forming wall section of said upper half, wherein said upper half and said lower half are abutted and connected to each other to form a main body unit of the cartridge for rotationally housing a disc therein, said upper and lower halves being unified together to form the main body unit of the cartridge by said upstanding peripheral wall sections and said housing forming wall sections thereof abutting against each other and by said first and second tubular sections compressing and abutting against said first and second abutment supports.

14. The disc cartridge according to claim 13, wherein said lower half includes a driving opening faced by a rotational driver configured to rotationally drive the disc held in the disc housing, and a recording or reproducing aperture faced by a recorder or a reproducer configured to record or reproduce the information for said disc.

15. The disc cartridge according to claim 13, wherein said first tubular section of said lower half is engaged with the tubular first abutment support of said upper half to prescribe an abutment reference position for said upper and lower halves.

16. The disc cartridge according to claim 15, wherein an abutment step configured to abut against the distal end of the first tubular section of the lower half is formed in the tubular second abutment support of said upper half.

17. The disc cartridge according to claim 15, wherein said upper and lower halves are formed of synthetic resin and wherein the distal ends of said upstanding peripheral wall sections, abutted against each other, are welded together.

18. The disc cartridge according to claim 13, wherein said main body unit includes a first side that includes said first and second positioning holes, and an inserting side that is opposite to said first side of said main body unit, and wherein the lateral side corresponding to said inserting side is a substantially semicircular arcuate section with the center of a disc held in the main body unit of the cartridge as the center of the arc.

19. The disc cartridge according to claim 18, wherein portions of said upstanding peripheral wall sections lying on the sides of said upper and lower halves form the outer peripheral wall section of said main body unit of the cartridge and a portion of said disc housing.

20. The disc cartridge according to claim 18, wherein the first side of said main body unit is a back side and wherein the lateral surface of said back surface is a curved section having a curvature smoother than that of the arcuate section on the inserting side.

* * * * *